United States Patent
Procopio et al.

(10) Patent No.: US 6,691,167 B2
(45) Date of Patent: Feb. 10, 2004

(54) METHOD AND APPARATUS FOR NETWORK PROBLEM SEGMENT ISOLATION

(75) Inventors: Peter J. Procopio, Apex, NC (US); Gary A. Meyer, Raleigh, NC (US); Eric R. Julien, Raleigh, NC (US); Eugene N. Cookmeyer, Apex, NC (US)

(73) Assignee: Acterna LLC, Germantown, MD (US)

( * ) Notice: Subject to any disclaimer, the term of this patent is extended or adjusted under 35 U.S.C. 154(b) by 59 days.

(21) Appl. No.: 10/058,694

(22) Filed: Jan. 28, 2002

(65) Prior Publication Data

US 2003/0145076 A1 Jul. 31, 2003

(51) Int. Cl.[7] .............................................. G06F 15/16
(52) U.S. Cl. ..................... 709/235; 709/210; 709/223; 709/224; 709/238; 709/239; 370/242; 370/243; 370/244; 370/245
(58) Field of Search ................................ 709/220, 223, 709/224, 238, 235, 239

(56) References Cited

U.S. PATENT DOCUMENTS

| | | | | |
|---|---|---|---|---|
| 5,299,201 A | * | 3/1994 | Carusone et al. | 714/704 |
| 5,546,540 A | * | 8/1996 | White | 709/223 |
| 5,768,552 A | * | 6/1998 | Jacoby | 345/441 |
| 6,023,452 A | * | 2/2000 | Shiragaki | 370/227 |
| 6,049,530 A | * | 4/2000 | Petersen et al. | 370/248 |
| 6,108,310 A | * | 8/2000 | Wilkinson et al. | 370/252 |
| 6,272,126 B1 | * | 8/2001 | Strauss et al. | 370/352 |
| 6,421,323 B1 | * | 7/2002 | Nelson et al. | 370/249 |
| 6,507,561 B1 | * | 1/2003 | Baniewicz et al. | 370/216 |
| 6,512,740 B1 | * | 1/2003 | Baniewicz et al. | 370/216 |

FOREIGN PATENT DOCUMENTS

DE      WO 00/18062      *   3/2000   ........... H04L/12/00

* cited by examiner

*Primary Examiner*—Saleh Najjar
(74) *Attorney, Agent, or Firm*—Moore & Van Allen, PLLC

(57) ABSTRACT

Method and Apparatus for Network Problem Segment Isolation. The present invention provides a method for characterizing network segment quality for a segment transmitting messages from a first endpoint to a second endpoint on a network. The method includes the step of receiving messages transmitted between the first and second endpoints. The messages include a first set of quality metrics for message transmission from the first to second endpoint for both the first and second segments and a second set of quality metrics for message transmission from the first endpoint to the juncture. Furthermore, the method includes subtracting the second set of quality metrics from the corresponding quality metrics of the first set of quality metrics to calculate a third set of quality metrics representing the quality metrics of the second segment. Additionally, the method includes comparing the third set of quality metrics to a first set of segment qualities.

45 Claims, 16 Drawing Sheets

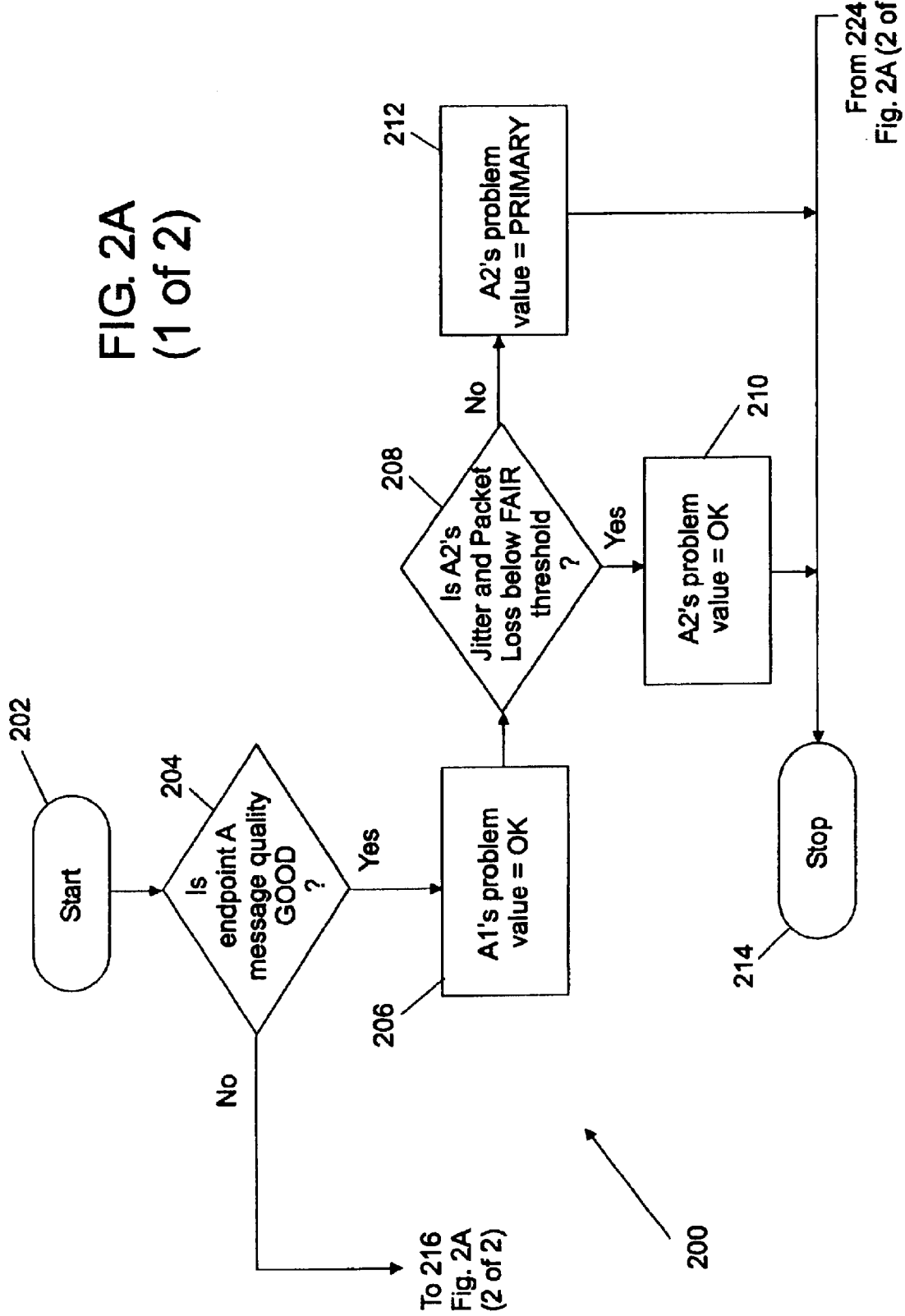

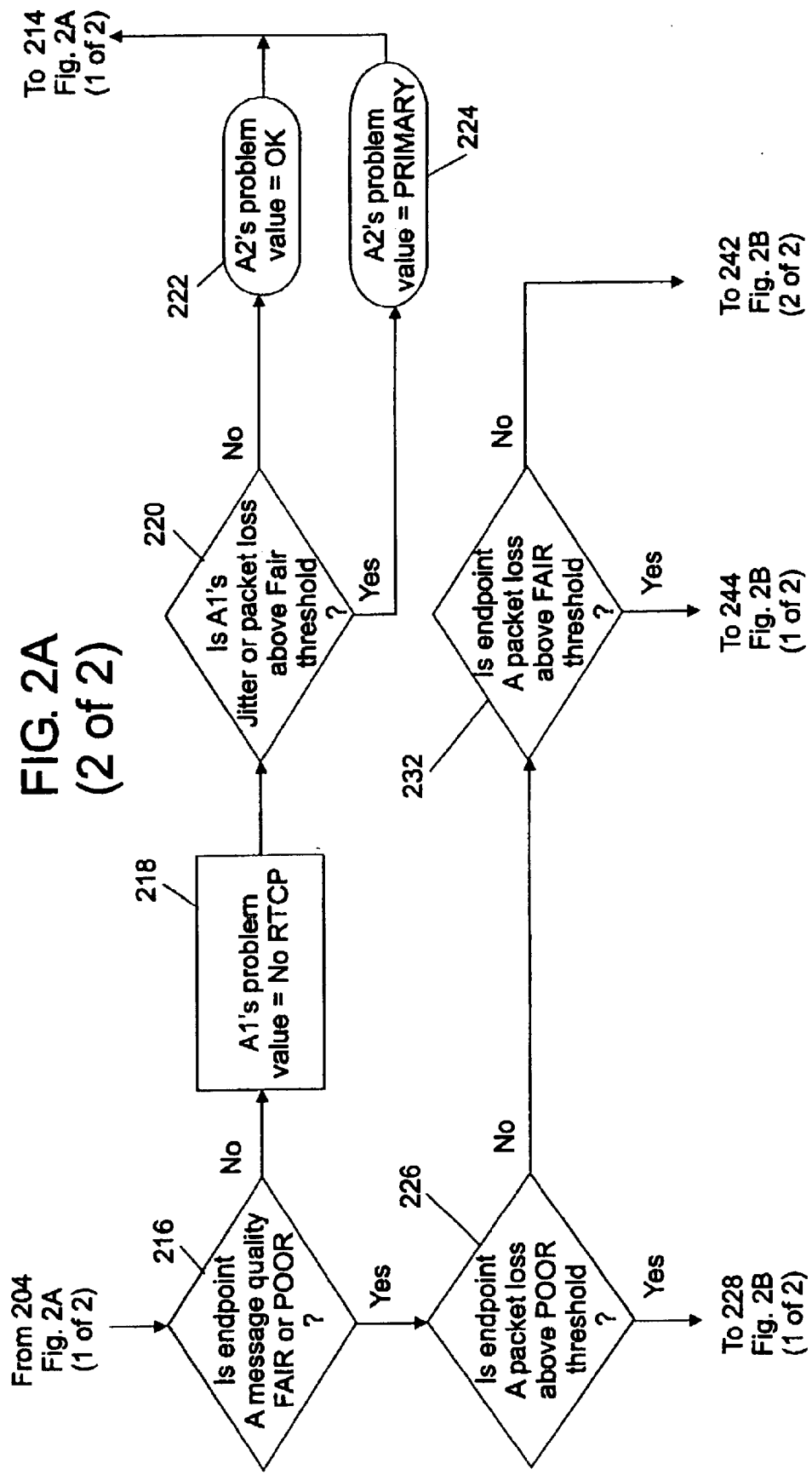
FIG. 2A (2 of 2)

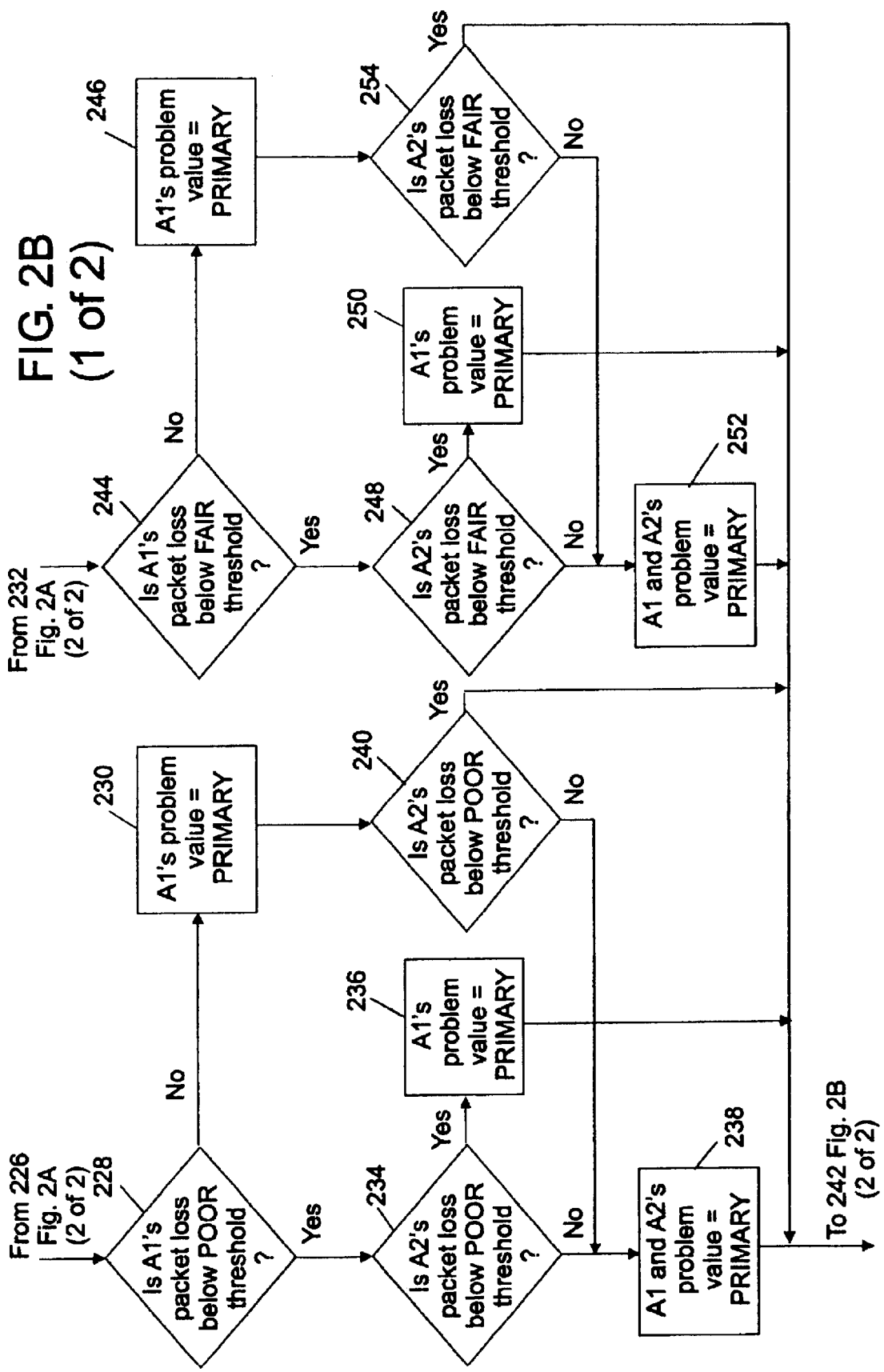
FIG. 2B (1 of 2)

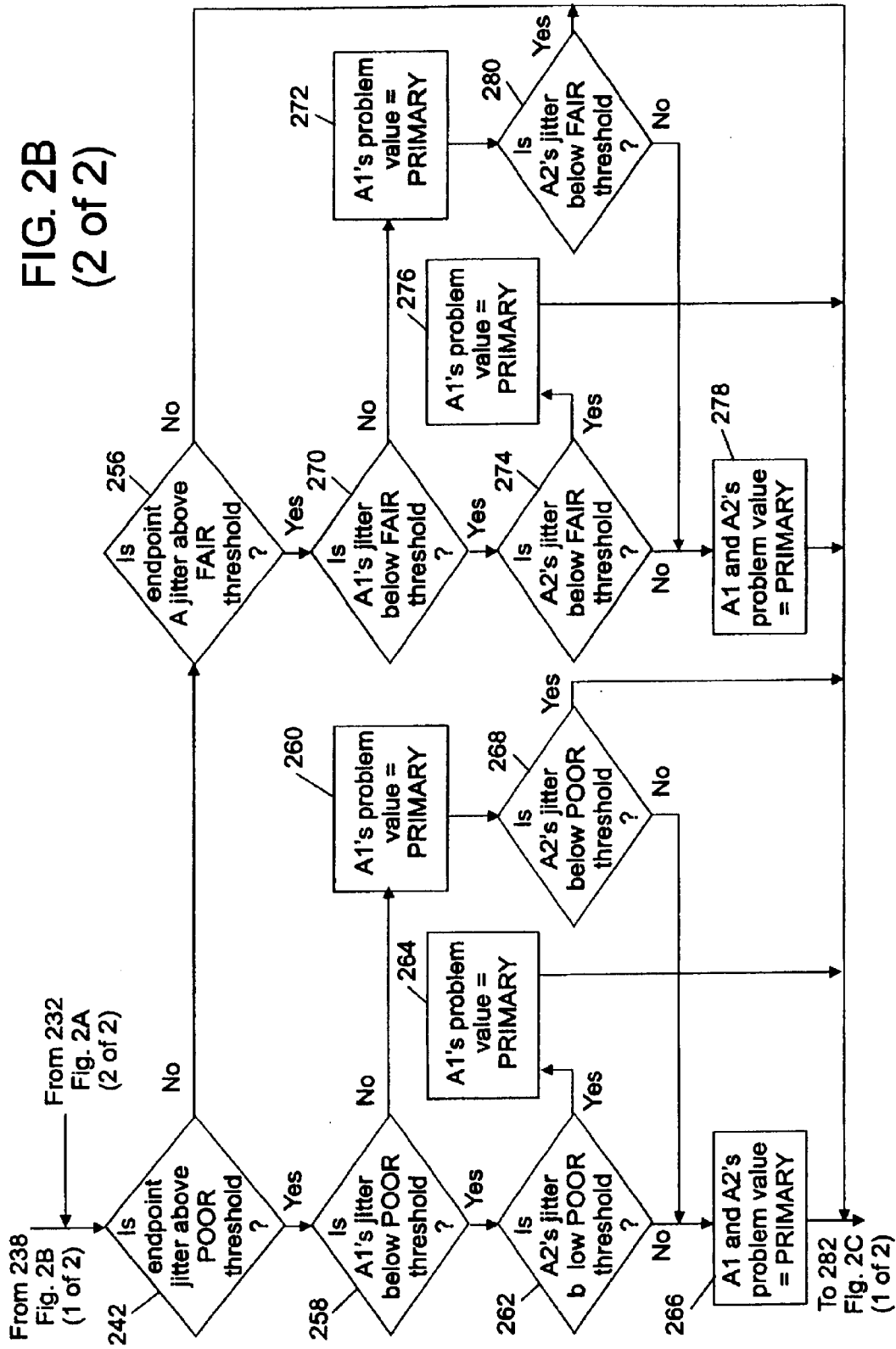
FIG. 2B (2 of 2)

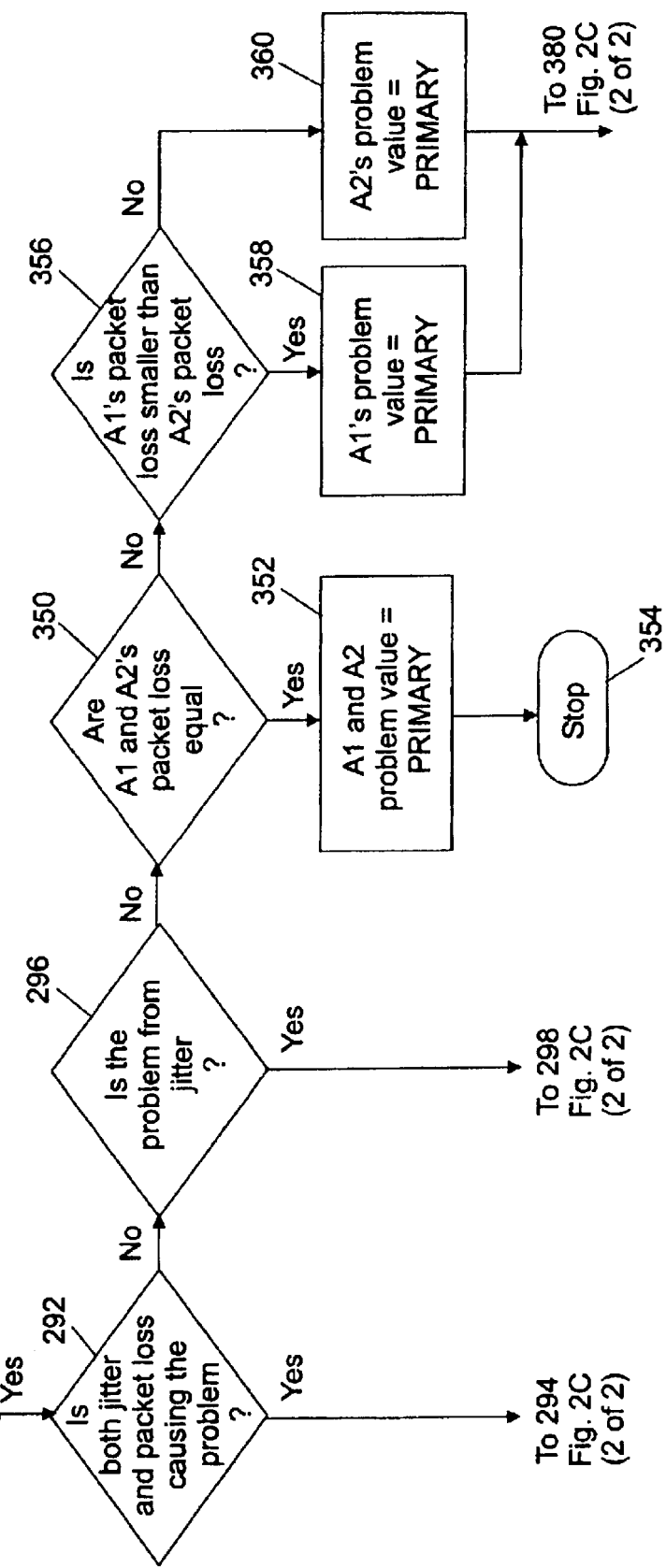# FIG. 2C (1 of 2)

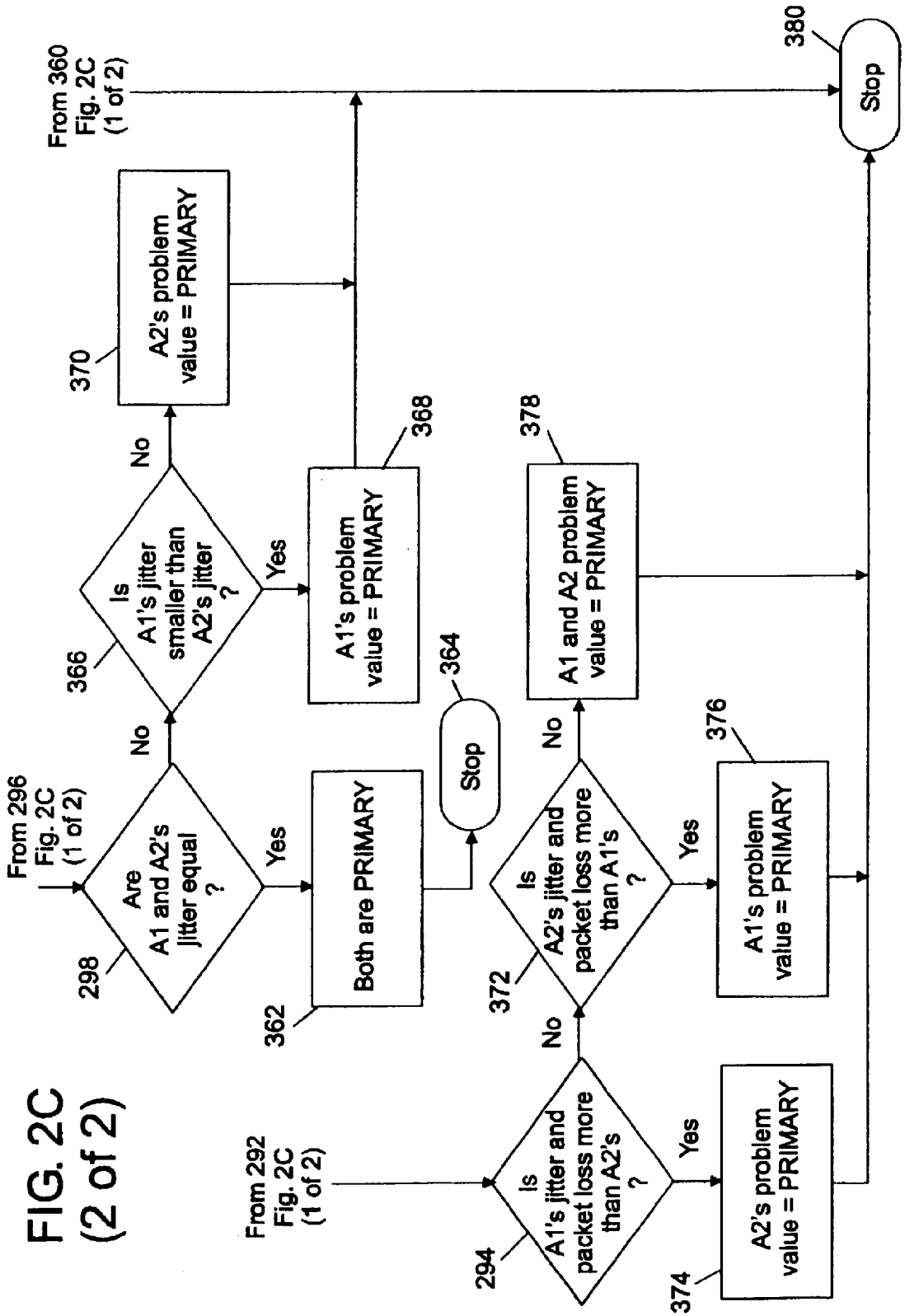
FIG. 2C (2 of 2)

METHOD AND APPARATUS FOR NETWORK PROBLEM SEGMENT ISOLATION

BACKGROUND

1. Field of the Invention

This invention relates to the field of devices for monitoring and analyzing networks. More particularly, this invention relates to devices for isolating network problems to certain segments on the network.

2. Description of the Problem

A primary objective of telephony providers is to provide users with high-quality voice service through packet networks. Packet networks transmit communication in messages which are commonly known as packets. A packet is a message carrying data for communication between two network endpoints, each having different IP addresses and port numbers. In particular, packet networks carrying voice communications must be closely managed to ensure performance quality acceptable by a user.

Many voice communication and other real-time applications use the Real-time Transport Protocol (RTP) for the transmission of messages. RTP contains quality metrics and is described in Request for Comments (RFC): 1889 and 1890, a series of notes about the Internet by the Internet Engineering Task Force (IETF), which are each incorporated herein by reference. Real-time Control Protocol (RTCP), a subset of RTP and described in detail in RFC: 1889 and 1890, is a network packet that also contains quality metrics, providing information on the quality of a voice communication, or message, at that moment. The headers for these protocols include quality metrics containing current information on jitter, packet loss, and delay. RTCP provides feedback information about the quality of data distribution. Quality metrics are useful to the senders, the receivers and third-party monitors for the discovery of network problems. Any type of network frame may carry quality metric.

Quality metrics are important to network administrators for the anticipation of performance changes and the diagnosis of performance failures. Network administrators use devices known as network analyzers to intercept messages containing quality metrics that are communicated between endpoints in order to assist in the monitoring and analysis of network performance. In order to monitor the traffic between two endpoints on a network, the network analyzer is connected to the network at a location in the network path where messages can be intercepted at a juncture between the two endpoints.

When analyzing network traffic, it necessary for network administrators to determine the source of a problem. When placing a network analyzer between two endpoints on a network, it would be helpful to be able to further narrow the location of a network problem to a segment of the network path.

SUMMARY

The present invention solves the above problem by providing the capability to determine the source of a network segment problem. Because the invention is able to provide an operator with information as to the source of a network problem, the operator is better able to manage voice and data services to network users. In one embodiment of the invention, the present invention provides a method for characterizing network segment quality for a segment transmitting messages from a first endpoint to a second endpoint on a network. The network includes first and second segments connected to the first and second endpoints respectively and to each other at a juncture. The method includes the step of receiving messages transmitted between the first and second endpoints at the juncture. The messages include a first set of quality metrics for message transmission from the first to second endpoint for both the first and second segments and a second set of quality metrics for message transmission from the first endpoint to the juncture. Furthermore, the method includes subtracting the second set of quality metrics from the corresponding quality metrics of the first set of quality metrics to calculate a third set of quality metrics representing the quality metrics of the second segment. Still furthermore, the method includes comparing the third set of quality metrics to a first set of segment qualities to characterize the quality of the second segment.

According to yet another embodiment of the invention, the method includes comparing the second set of quality metrics to a second set of segment qualities to characterize the quality of the first segment and comparing the first set of quality metrics to a third set of segment qualities to characterize the quality of the message transmission from the first endpoint to second endpoint.

According to another embodiment of the invention, determining whether the second set of quality metrics are each below associated thresholds for the first segment and indicating to a user there is a problem with the first segment if the second set of quality metrics are not each below associated thresholds.

According to yet another embodiment of the invention, the present invention provides a computer program product for enabling a computer system to characterize network segment quality for a segment transmitting messages from a first endpoint to a second endpoint on the network.

According to another embodiment of the invention, the present invention provides an apparatus for characterizing network segment quality for a segment transmitting messages from a first endpoint to a second endpoint on the network.

These and other advantages of the present invention will become apparent to those skilled in the art upon a reading of the following specification of the invention and a study of the several figures of the drawings.

BRIEF DESCRIPTION OF THE DRAWINGS

FIGS. 2A, 2B, and 2C illustrate a process as a flow diagram of an embodiment of the present invention for characterizing network segment quality for a segment transmitting messages from one endpoint to a second endpoint.

DETAILED DESCRIPTION

The present invention relates to a knowledge-based, expert analysis system for monitoring and analyzing packet network telephony. The present invention is a troubleshooting tool aimed at the analysis and resolution of packet network telephony problems by providing an indication of the location of a network problem based upon quality metrics retrieved from network frames. This information may be presented to the user through a graphical user interface (GUI), such as a screen display, or a computer printer.

Figure 5:
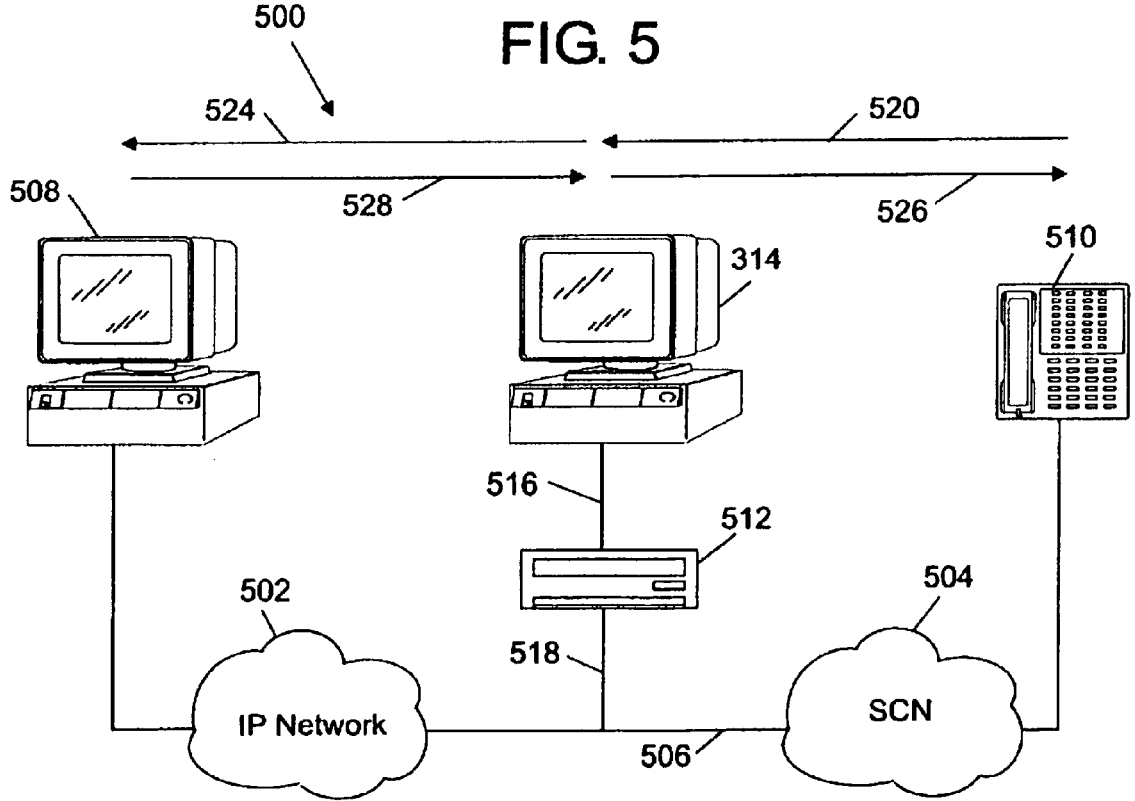
FIG. 5 is a figurative illustration of an IP network and a switched communication for transmitting voice communication.

A packet switching network such as an IP network is an example of the operating environment for the present invention. Referring to FIG. 5, a figurative illustration of an IP network 502 and a switched communication network 504, connected by serial link communication medium 506, for transmitting voice communication from H.323 endpoint 508 to a voice endpoint 510 connected to the SCN 504. The H.323 endpoint 508 is a terminal for providing voice communication and intended for connection to an IP network. The voice endpoint 510 is an endpoint, such as a known telephone, for providing voice communication through a SCN. The IP network 502 and switched communication network 504 may contain sub-networks, and is only intended in this description to illustrate a basic level of application.

A computer system, comprising a network analyzer 512 and a host computer 314, as known in the art, is provided having the necessary hardware and software to capture, analyze, and monitor network frames. In particular, the computer system is provided as an example of a device comprising the present invention. The network analyzer 512 is provided as an example of a network device having the functions of encoding network frames, decoding network frames, and emulating network traffic. The network analyzer 512 and host computer 314 is provided as an example of a device requiring the functions of providing a means of presenting network frame data to the host computer 314. The network traffic on the serial link communication medium 506 is in framed, serial digital bit format, a network frame. In practice, the host computer 314 may be local to, or remote from, the network. For local use, as depicted in FIG. 5, the host computer 314 is connected through its port and cable 516 to a network analyzer 512. The network analyzer 512 is in turn connected through a network connection 518, or lines, to the serial link communication medium 506 at a juncture. The host computer 314 may be utilized to facilitate operator interface. A network analyzer's monitoring, diagnostic, and problem resolution activities are under software control. Such software control is exercised by a main central processing unit (CPU), which is usually one or more microprocessors contained within the network analyzer 512 itself.

As an example of the operation of the present invention, the network analyzer 512 receives messages that are transmitted between the H.323 endpoint 508 and the voice endpoint 510. The network analyzer extracts certain information from the received messages to determine the location of a network problem. The network analyzer is able to narrow the location of a network problem to the segment of a network having a network problem. As referred to herein, a network segment is a section of the network that transmits messages in one direction between two endpoints on the network. For example, referring to FIG. 5, there are 4 segments that the network analyzer 512 may determine to have a network problem: the section of the network carrying messages from voice endpoint 510 to H.323 endpoint 508 between the voice endpoint 510 and the network analyzer 512 (referred to herein as segment A2 and indicated at 520); the section of the network carrying messages from voice endpoint 510 to H.323 endpoint 508 between the network analyzer 512 and H.323 endpoint 508 (referred to as segment A1 and indicated at 524); the section of the network carrying messages from H.323 endpoint 508 to voice endpoint 510 between the voice endpoint 510 and the network analyzer 512 (referred to herein as segment B1 and indicated at 526); and the section of the network carrying messages from voice endpoint 510 to H.323 endpoint 508 between the network analyzer 512 and the voice endpoint 510 (referred to as segment B2 and indicated at 528). A characterization of the network problem on a particular network segment may then be reported to a user on a display of the host computer 314.

Figure 1A:
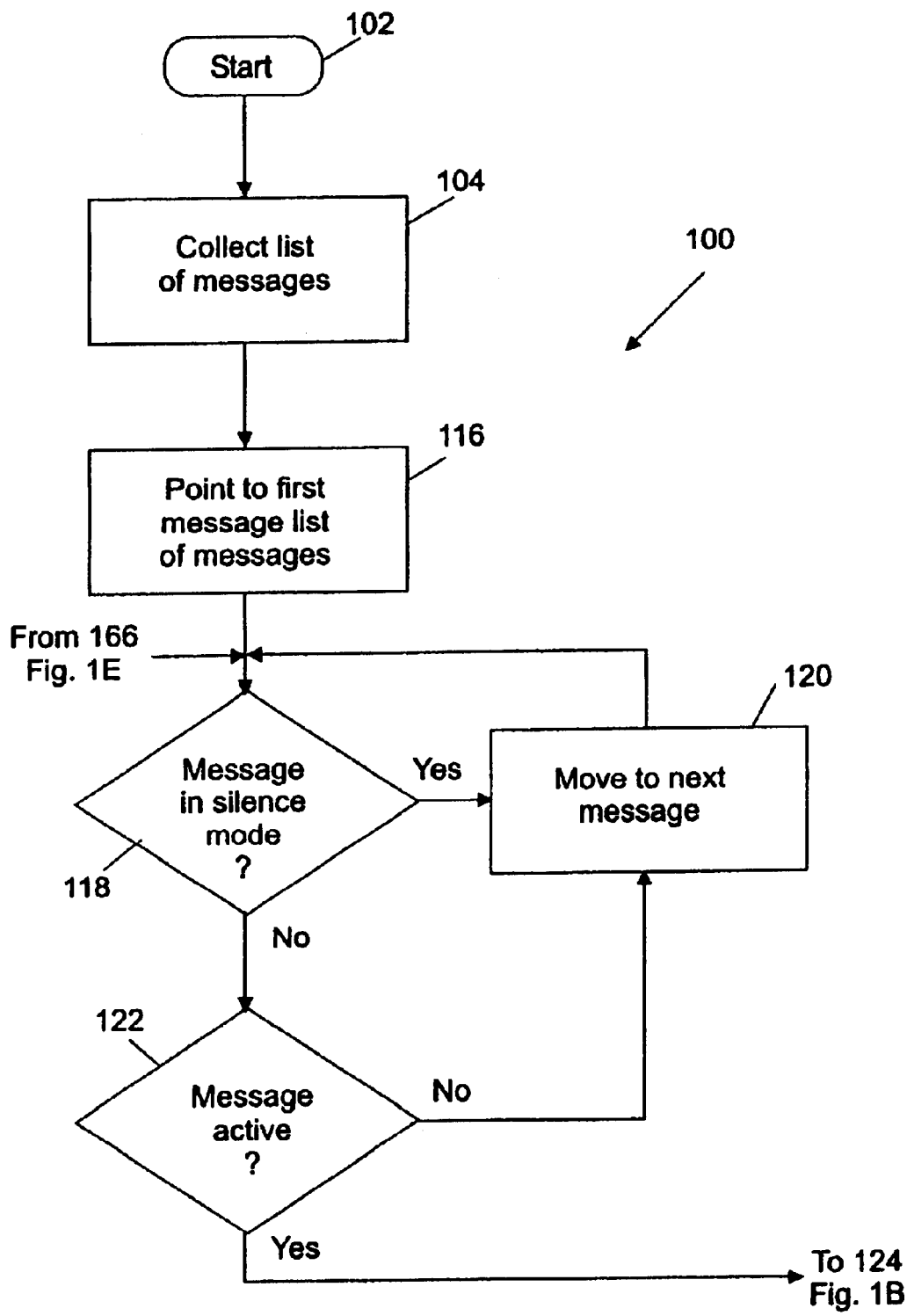
FIGS. 1A, 1B, 1C, 1D, and 1E illustrate a flow diagram of an embodiment for determining message quality.
Figure 1B:
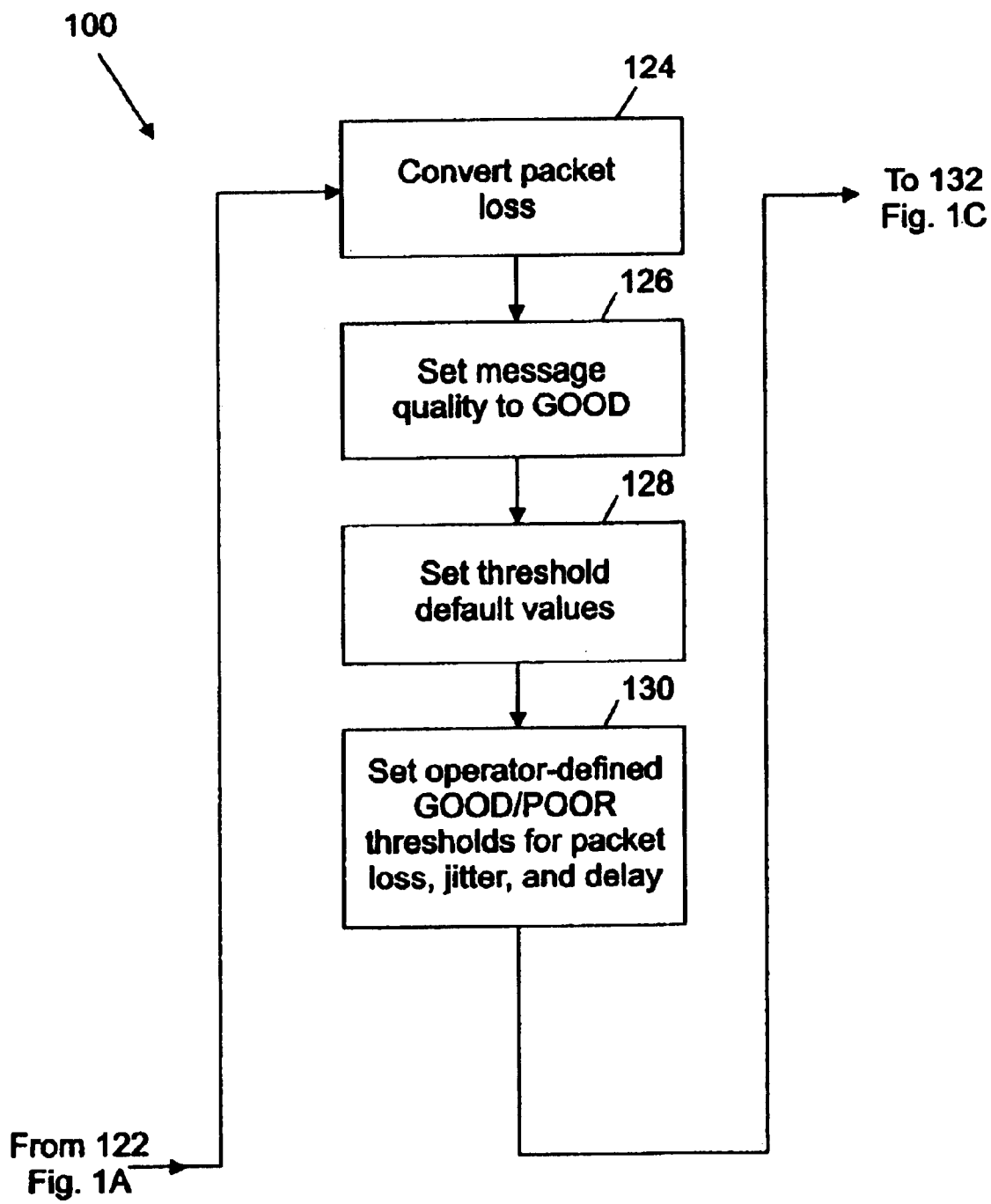
Figure 1C:
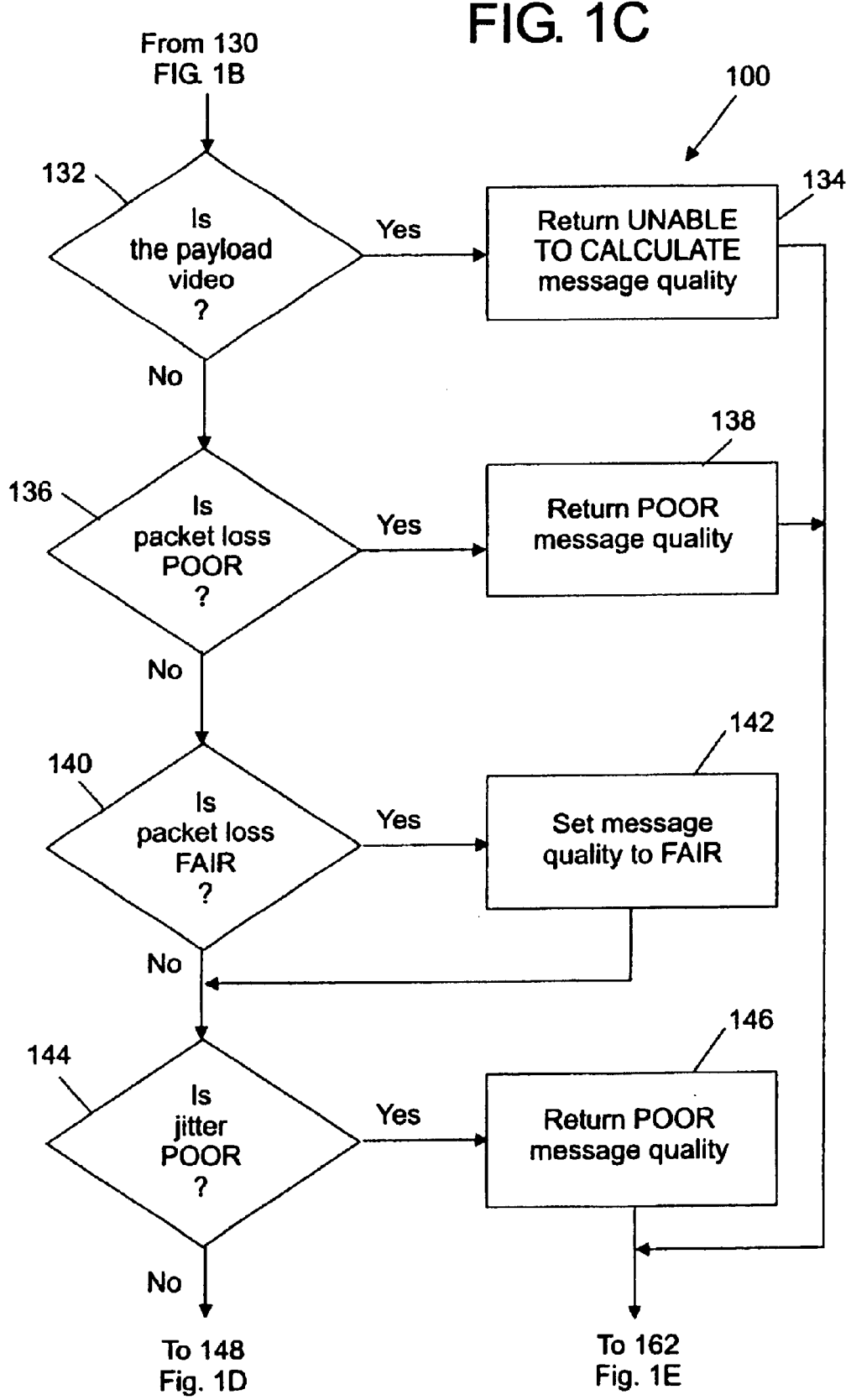
Figure 1D:
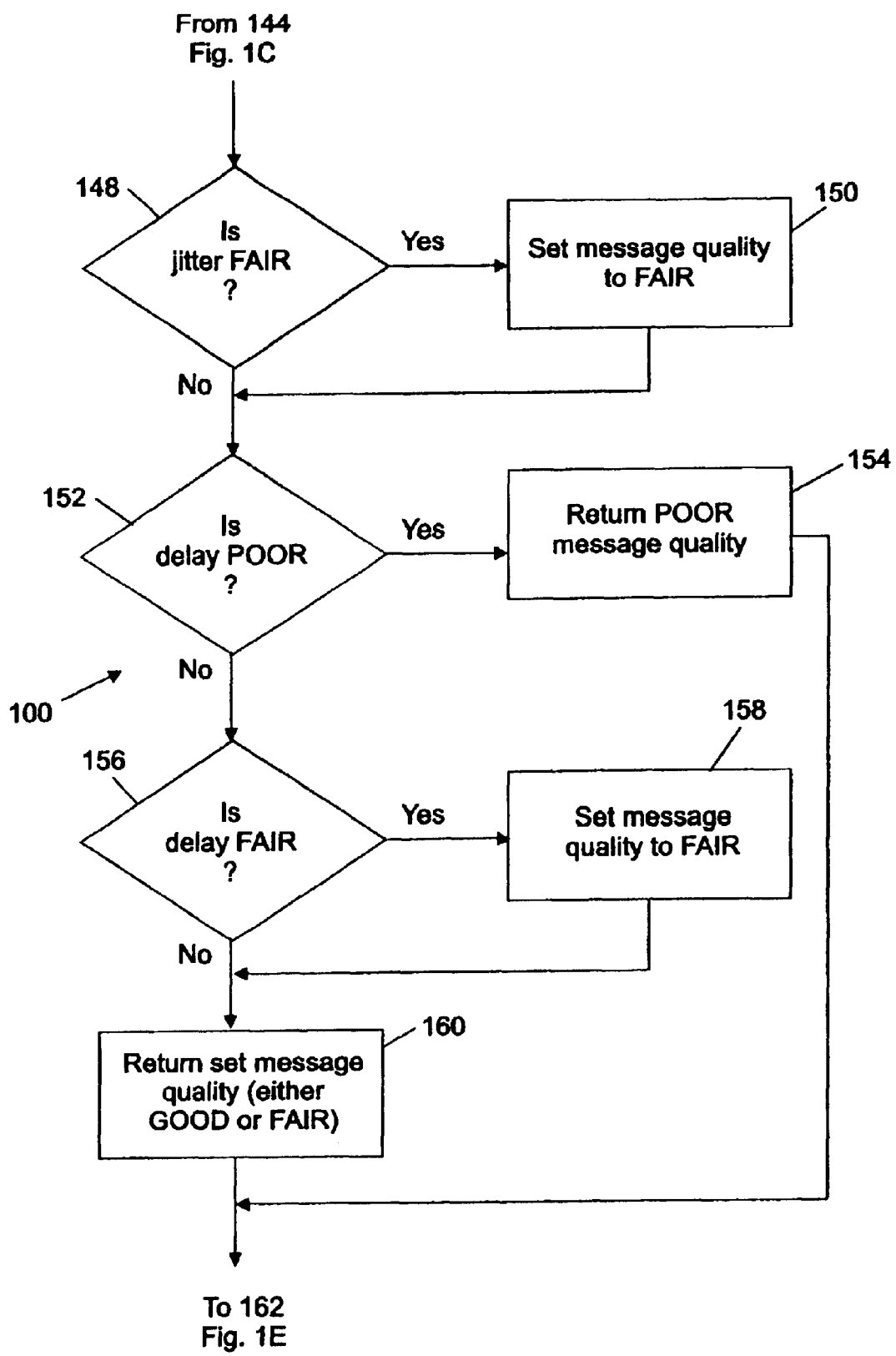
Figure 1E:
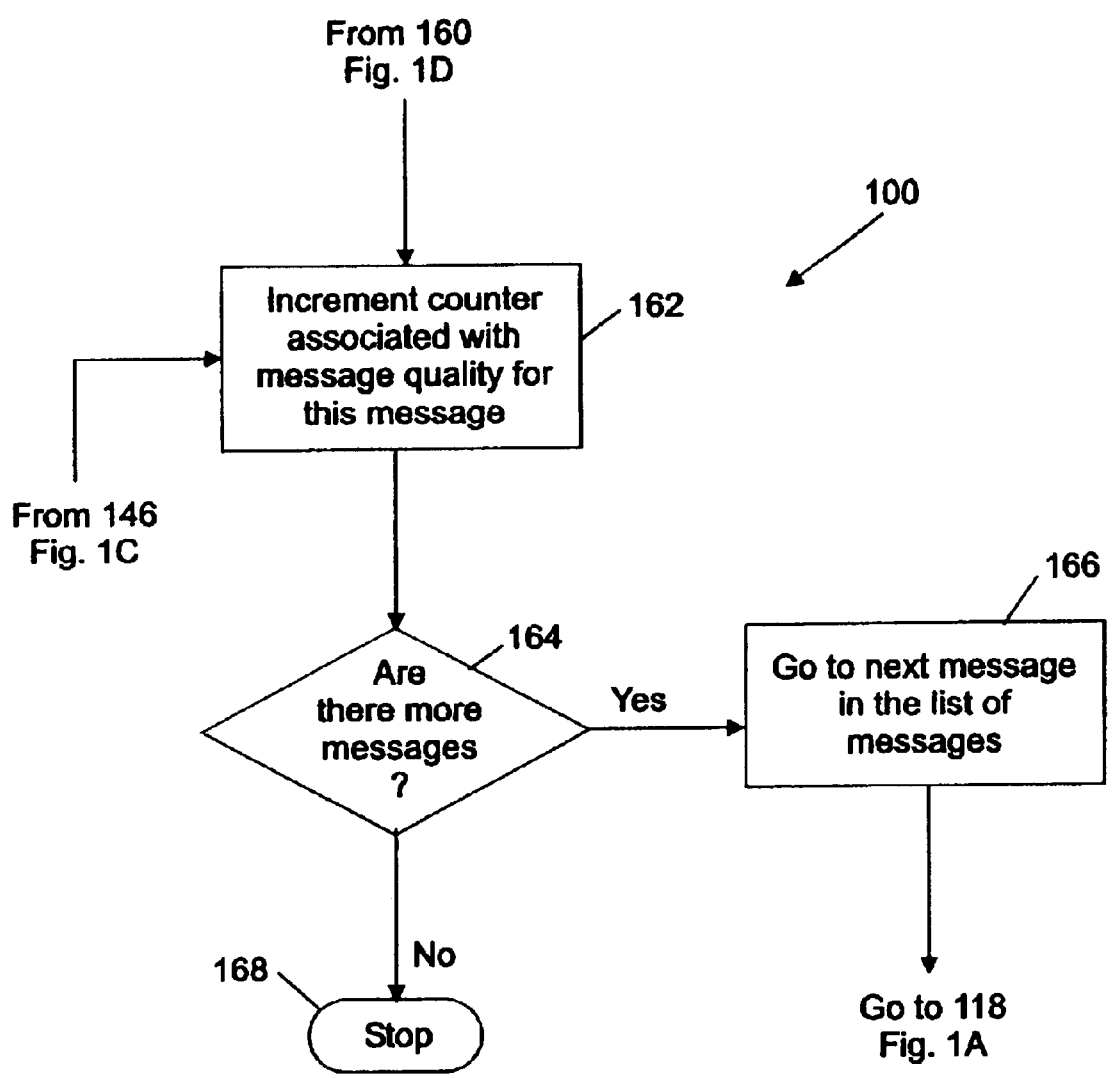
Figure 3:
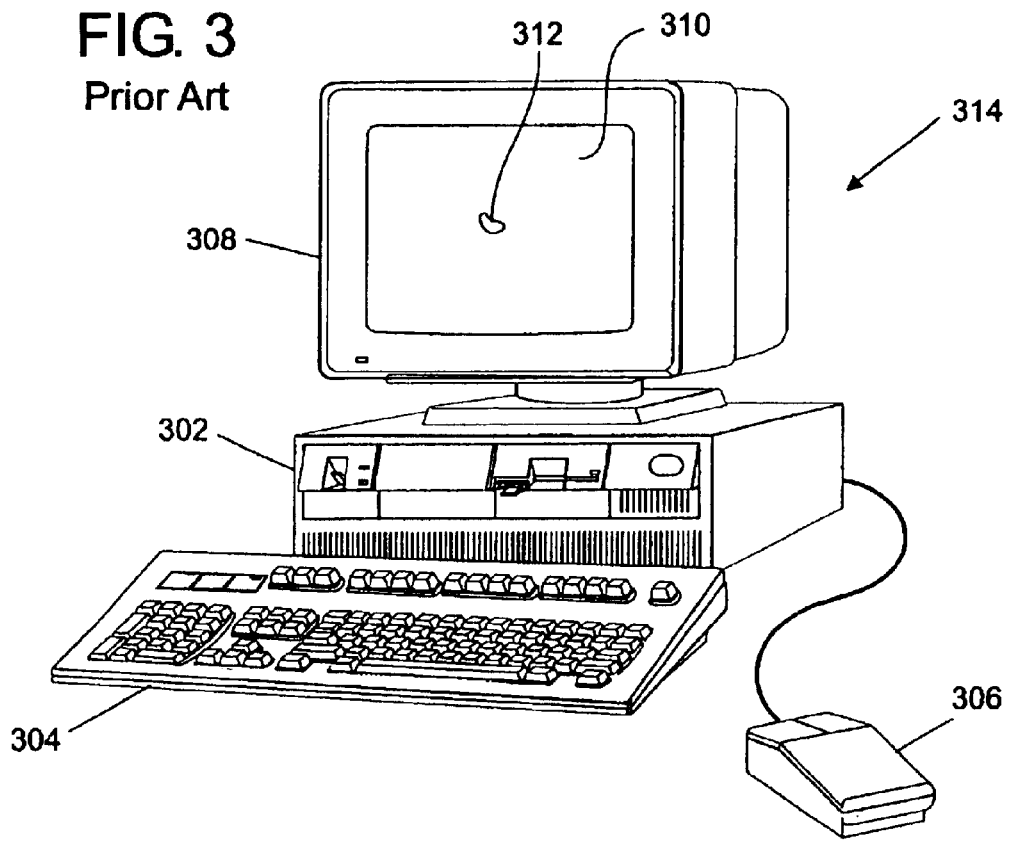
FIG. 3 illustrates a host computer comprising a system unit, a keyboard, a mouse, and a display.

Referring now to FIG. 3, the host computer 314 of FIG. 5, comprising a system unit 302, a keyboard 304, a mouse 306, and a display 308, is illustrated in detail. The screen 310 of the display 308 is used to present the visual changes to the data object. The GUI supported by the operating system allows the user to use a point and shoot method of input by moving the pointer 312 at a particular location in the GUI displayed on the screen 310 and press one of the mouse buttons to perform a user command or selection.

Figure 4A:
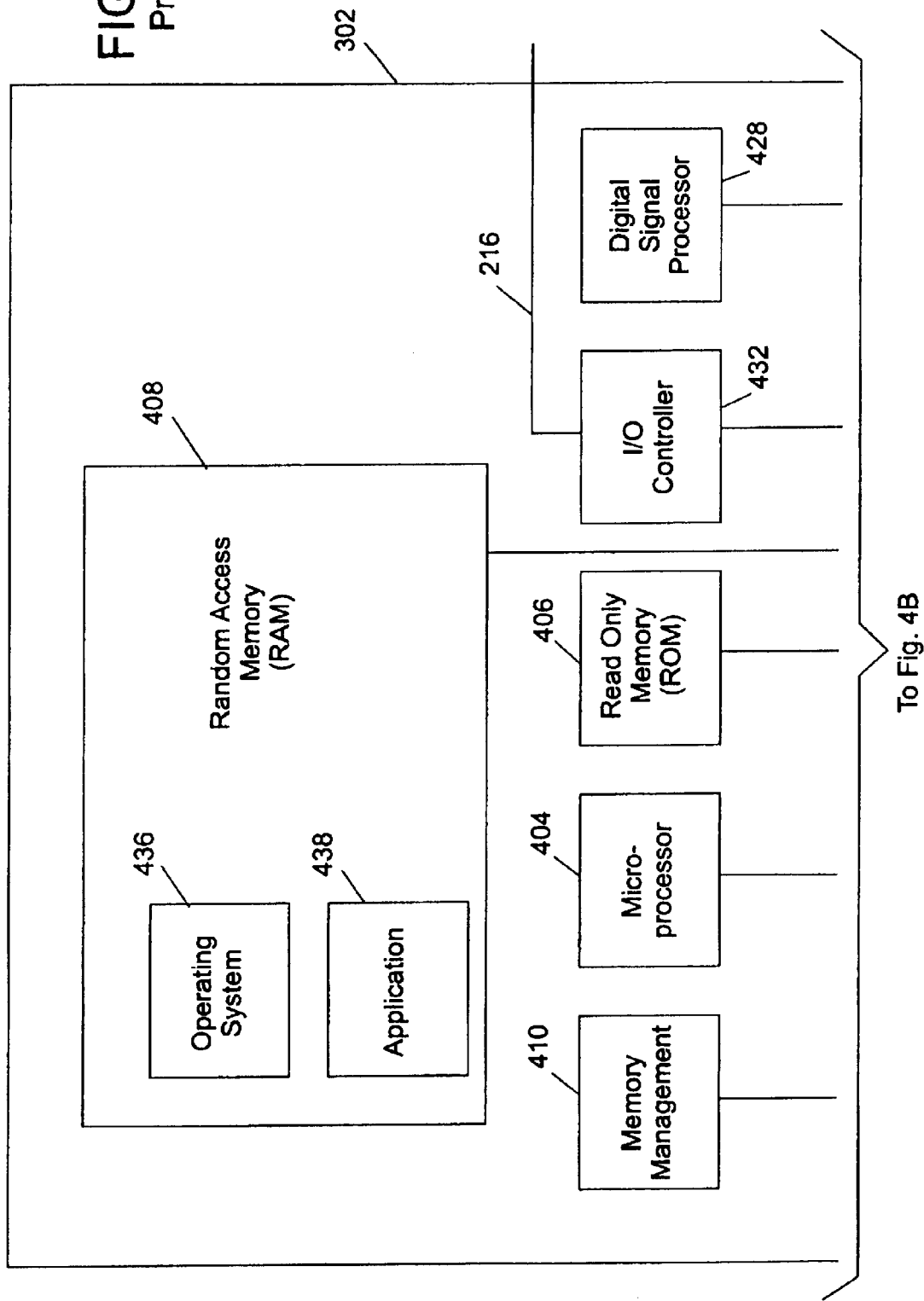
FIGS. 4A and 4B illustrate a block diagram of the components of a host computer.
Figure 4B:
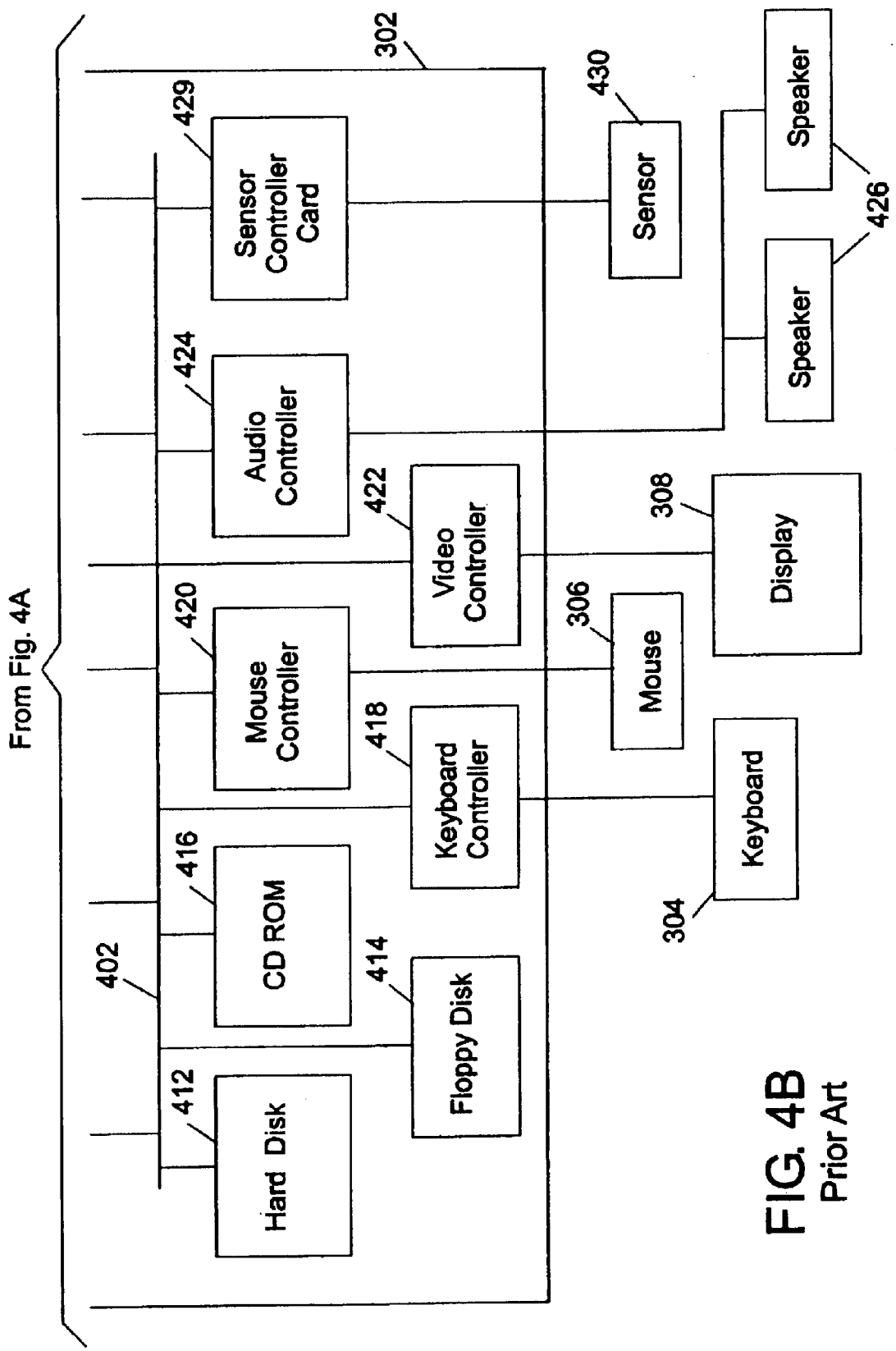

Referring now to FIGS. 4A and 4B, a block diagram of the components of the host computer 414 shown in FIG. 3 is illustrated. The system unit 302 includes a bus or a plurality of buses 402 to which various components are coupled and by which communication between the various components is accomplished. The processor 404 is connected to the bus 402 and is supported by read only memory (ROM) 406 and random access memory (RAM) 408 also connected to the bus 402. The ROM 406 contains among other software code the Basic Input-Output system (BIOS) which controls basic hardware operations such as the interaction and the disk drives and the keyboard. The RAM 408 is the main memory into which the operating system and application programs are loaded. The memory management chip 410 is connected to the bus 402 and controls direct memory access operations including, passing data between the RAM 408 and hard disk drive 412 and floppy disk drive 414. The CD ROM 416 also coupled to the bus 402 is used to store a large amount of data, e.g., a multimedia program or presentation.

Also, connected to this bus 402 are various I/O controllers: the keyboard controller 418, the mouse controller 420, the video controller 422, and the audio controller 424. The keyboard controller 418 provides the hardware interface for the keyboard 304, the mouse controller 420 provides the hardware interface for the mouse 306, the video controller 422 provides the hardware interface for the display 308, and the audio controller 424 provides the hardware interface for the speakers 426. Also coupled to the bus 402 is digital signal processor 428 which is incorporated into the audio controller 424. A sensor controller card 429 is coupled to the bus 402 and converts the electrical signals from a sensor 430 into messages usable by the host computer 314. An I/O controller 432 enables communication over the cable 418 to the network analyzer 412.

The RAM 408 includes an operating system 436 and application program 438. The application program 438 included on the RAM 408 is for running the operation of the present invention. The operating system 436 controls the GUI presented by the host computer 314 on the display 308 and the access of other application programs to user input from the input devices. Some operating systems may operate in cooperation with a presentation manager to manage the GUI. In the GUI, the objects, e.g., the operating system, operating system utilities, applications and data files are represented by icons or windows on the display 308. The GUI may be used to present network quality reports to the user. The user may move the cursor or pointer to an icon position to open or otherwise manipulate the object. Furthermore, in the present invention, icons are displayed to indicate a characterization of network segment quality.

A display simplifies information for presentation to a user. In one embodiment of the invention, the display presents graphics providing a description of the network problem. These graphics are displayed as icons representing the segment of the network having a problem and a characterization of the problem. In this embodiment, a network segment quality is characterized as being either a primary problem, no problem, or undetermined. This characterization is indicated to a user by a problem indicator. Furthermore, network segment quality may be characterized as being a secondary problem that indicates to the user that the network segment is a minor contributor to the overall problem. A primary problem is identified by a primary indicator that informs the user that the problem is a major contributor to the overall problem. Additionally, an undetermined indicator is used to indicate that the network analyzer is unable to determine the affect that a particular endpoint has on quality. Endpoint indicators indicate the quality of the message as perceived by the device at that endpoint. RTCP and RTP statistics, such as jitter, packet loss, and delay, are used for characterizing network segment quality. This is presented to the user within the associated endpoint icon.

Figure 7:
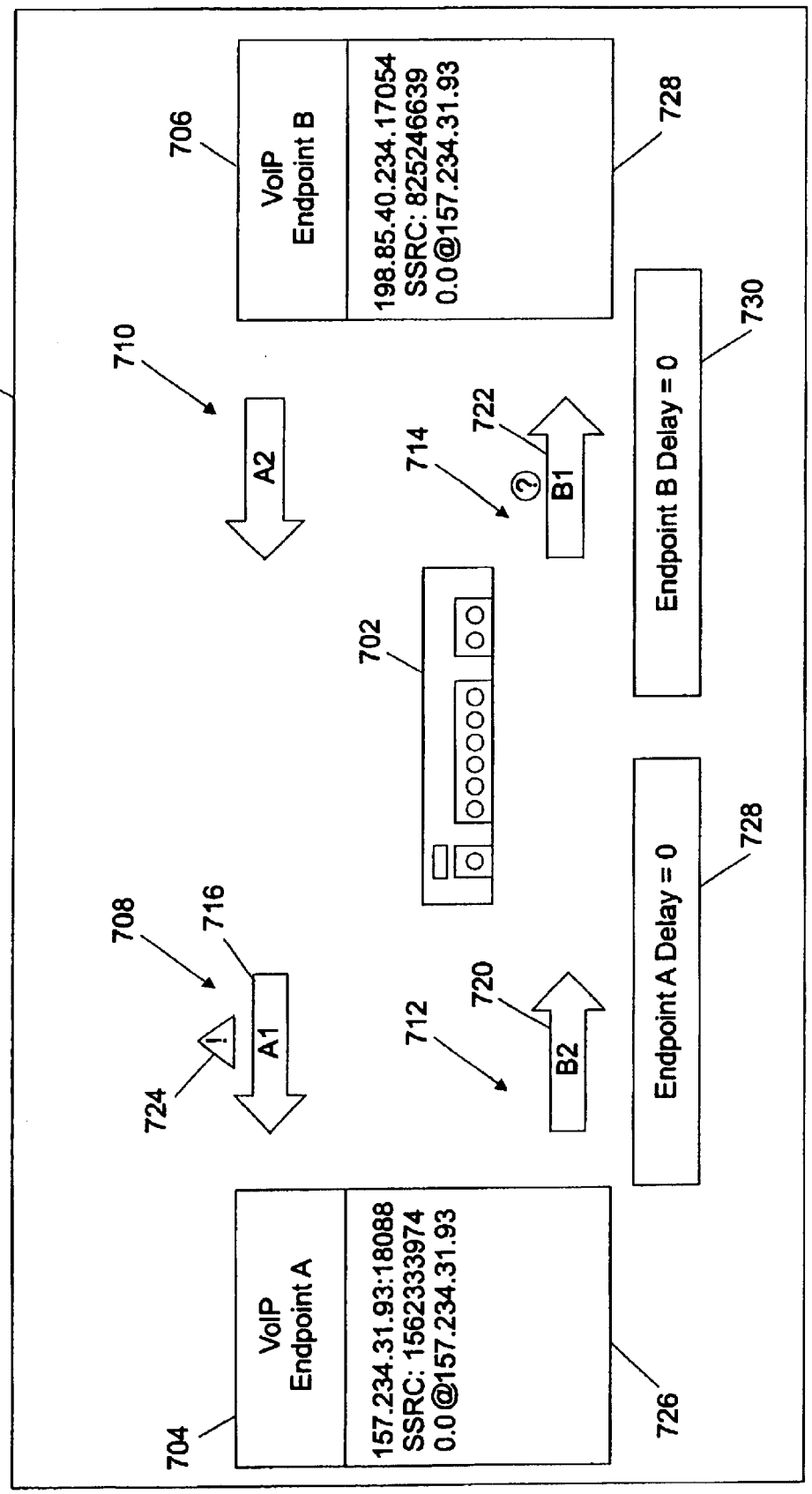
FIG. 7 illustrates an embodiment of a display screen for presenting network segment quality to a user.

Referring to FIG. 7, a screen of the display 700 for presenting network segment quality to a user is illustrated. A network analyzer 702 is presented as an icon on the display 700. Two endpoints, endpoint A 704 and B 706, are presented on opposite sides of the network analyzer 702 to illustrate to a user their actual configuration with the network analyzer 702. The network analyzer receives messages transmitted between the two endpoints that are graphically presented to the user. The text, at reference number 724 and 726, provides information identifying the endpoint to which the icon relates. The text within the endpoint displays the IP address, port number (PORT NUBR), Synchronization Source ID (SSRC), and Canonical Name (CNAME) for the endpoint. The quality of the network segments between endpoint A 704 and B 706 may be one of a set of segment qualities which are presented as a specific color within the associated endpoint icon. The process for determining message quality is shown as a flow diagram in FIGS. 1A, 1B, 1C, 1D, and 1E and described in further detail hereinafter. In this embodiment, these segment qualities are one of POOR, FAIR, and GOOD, as described in detail hereinafter. In this embodiment for the display, the color red represents POOR message quality, yellow represents FAIR message quality, and green represents GOOD message quality for the endpoint.

Direction indicators are icons presented to a user to indicate network segment quality on four segments. Icons may be displayed above each of the direction indicators indicate to a user the quality of the associated segment. Referring to FIG. 7, direction indicator 716 indicates to a user the network segment quality for messages transmitted from endpoint B 706 to endpoint A 704 and located on the segment connecting the network analyzer 702 and endpoint A. Direction indicator 710 indicates network segment quality for messages transmitted from endpoint B 706 to endpoint A 704 and located on the segment connecting endpoint B 706 and the network analyzer. Conversely, direction indicator 714 indicates network segment quality for messages transmitted from endpoint A 704 to endpoint B 706 and located on the segment connecting endpoint B 706 and the network analyzer 702. Direction indicator 712 indicates network segment quality for messages transmitted from endpoint A 704 to endpoint B 706 and located on the segment connecting endpoint A 704 and the network analyzer 702.

The direction indicators (710, 712, 714, and 716) indicate a characterization of network segment quality in an associated segment by displaying an icon above the direction indicator. When no icon is displayed above a direction indicator, there is no problem with the associated segment. Any icon present above the direction indicator is cleared to display no icon when there is no problem with the associated segment. Direction indicators referenced by 718 and 720 are examples of the display when there is no problem associated with the associated segment. In this example, a primary icon 724 is displayed above the direction icon 716 indicating that the associated segment is characterized as having a primary problem. Furthermore in this example, an undeterminable icon 714 is displayed above the direction icon 722 indicating that the network segment quality associated with this segment is undeterminable.

A delay icon, shown at reference numeral 728 and 730, presents the delay for endpoint A and endpoint B respectively. The delay is calculated from quality metrics included in the RTCP messages received by the network analyzer from both endpoints.

As the network analyzer receives messages, segment quality is determined based on quality metrics contained in messages received between two endpoints under analysis. Segment quality is determined by comparing the quality metrics to a set of segment qualities having thresholds for determining whether message quality is one of the set of segment qualities. This process is an automatic process run by the host computer 314 and network analyzer 512. The network analyzer 512 continuously receives messages, or network frames, from the network via the network connection 518. The network analyzer 512 processes the received network frames by extracting certain message quality metric fields from those network frames containing RTP and RTCP headers. Alternatively, the network analyzer 512 gathers different control protocol messages or all network frames. The network analyzer 512 then stores the extracted message quality metrics in a message list. The message list is a linked list stored in a memory device such as memory storage on the network device or computer-readable memory.

In this embodiment of the present invention, the quality metrics used to determine segment quality or message quality are packet loss, jitter, and delay. Alternatively, other quality metrics may be used. Furthermore, the thresholds used to determine the segment or message quality may any value determined by the user. Packet loss is FAIR when it is greater than or equal to 4% and less than 12%. Packet loss is POOR when it is greater than or equal to 12%. Packet loss is GOOD when it is less than 4%. Jitter is FAIR when it is greater than or equal to 75 milliseconds and less than 125 milliseconds. Jitter is POOR when it is greater than or equal to 125 milliseconds. Jitter is GOOD when it is less than 75 milliseconds. Delay is FAIR when it is greater than or equal to 250 milliseconds and less than 500 milliseconds. Delay is POOR when it is greater than or equal to 500 milliseconds. Delay is GOOD when it is less than 250 milliseconds. In this embodiment of the present invention, the segment or message quality is either GOOD, FAIR, or POOR. Alternatively, any other or number of message qualities may be used.

Figure 6:
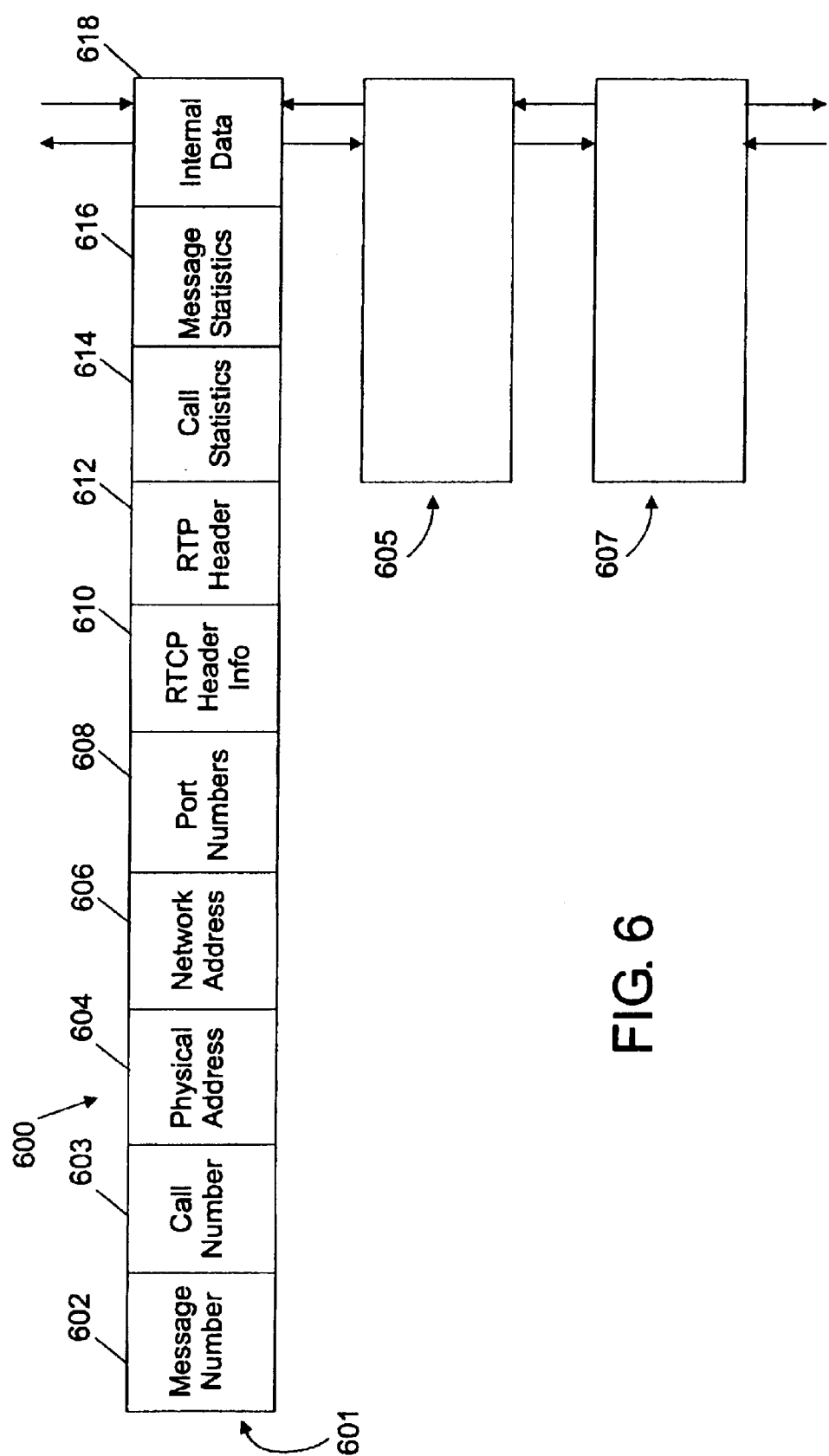
FIG. 6 is a figurative illustration of a message list.

Referring now to FIG. 6, a message list 600 is illustrated. The message list 600 is a linked list of entries which contain information for each message being tracked, some of which are illustrated by reference numbers 601, 605, and 607. Entries are grouped in the message list by the message in which they are associated and by the order received. Message number 603 holds data indicating the message with which the entry is associated. The message number 602 contains data ordering the entry in the order the message was received by the network analyzer 512. Physical address 604, network address 606, and port numbers 608 contain data indicating the network device that sent the message. Internal data 618 includes pointers to the previous and next entry in the message list for the manipulation of the message list. RTCP header 610 and RTP header 612 contain quality metrics that have been extracted from the message and subsequently stored in the message list. Call statistics 614 contain miscellaneous statistics for a series of calls between two endpoints. Message statistics 616 contain quality results for the entry.

Messages are continually received and stored by the network analyzer 512 in the message list. The messages provide quality metrics about the jitter, packet loss, and delay. RTCP messages received from an endpoint provide quality metric information about the transmission of a message from another endpoint. For example, an RTCP message transmitted from endpoint A to endpoint B provides quality metric information on messages transmitted from endpoint B to endpoint A. Furthermore, an RTP message transmitted from endpoint B to endpoint A provides quality metric information on the message's transmission from endpoint B to endpoint A. When such an RTP message is intercepted on the network path between endpoints A and B, then the quality metrics can be interpreted for transmission between endpoint B and the juncture that the messages are received. These quality metrics can then be subtracted from RTCP messages transmitted from endpoint A to B in order to determine quality metrics from endpoint A to the juncture that the messages are received. Message quality is defined as one of GOOD, FAIR, POOR, or UNABLE TO CALCULATE.

Referring now to FIGS. 1A, 1B, 1C, 1D, and 1E, a flow diagram 100 of the preferred embodiment of the process for determining message quality is illustrated. This process can be called by an operator for display or called for a process for reporting message quality. For example as discussed hereinbefore in regard to FIG. 7, this process determines the message quality for the endpoint that is displayed as a color in the area designated at 724 and 726. The process begins at the start step referenced by 102. When the 5-second interval has passed, the message list is collected 104 from the network analyzer 512. Messages in the message list are transitioned by use of a pointer, as known in creating databases. The message list is stored in a memory device such as memory storage on the network device or computer-readable medium.

At step 116, a pointer for the message list points to the first message in the message list for transitioning the message list. A pointer is a special type of memory variable that points to a memory address. In the preferred embodiment, the pointer points to messages in the message list. Next, it is determined whether the message is in a silence mode 118. The silence mode occurs when one end of a message is still connected while no longer sending voice messages. During silence mode, instantaneous message quality cannot be determined. If the current message is in the silence mode, the pointer moves to the next message 120. Steps 118 and 120 are repeated until a message is found that is not in the silence mode.

When the process 100 is in step 118 and it is determined that the message is not in silence mode, the next step is referenced by 122. At step 122, it is determined whether the message is active. If the message is not active, then the next step is step 120 since quality should not be calculated for an inactive message. If the message is active, the packet loss is converted to something usable 124. Packet loss must be converted to a format that is compatible with this instantaneous message quality determination. The converted value is determined by changing the packet loss value provided in the RTCP field into a percent. This percentage is calculated by multiplying this packet loss value by 100/256.

Message quality is determined by threshold values set for each of jitter, packet loss, and delay. These threshold values set the minimum values for the quality metrics. The message quality of the message is set to GOOD at step 126 for default. Next, the basic thresholds are set to the default values 128. In the preferred embodiment, packet loss default value is set to zero (0) percent for POOR and GOOD quality. Delay is set to zero (0) milliseconds for POOR and GOOD quality. Jitter is set to zero (0) milliseconds for POOR and GOOD quality. The thresholds are then set to any thresholds that have been defined by the operator 130. The operator can set the largest amount of packet loss before the message is considered POOR or FAIR. Additionally, the operator can set the largest amount of jitter before the message is considered POOR or FAIR. Furthermore, the operator can set the largest amount of delay before the message is considered POOR or FAIR.

The payload type field contained in the RTP header determines payload. In step 132, it is determined whether the payload is video by examining the payload type field. If the payload is video, then the instantaneous quality is UNDETERMINED 134. After step 134, the next step is step 162 (FIG. 1B) as described below. If the payload is not video, the next step is referenced by 136.

At step 136, it is determined whether the packet loss quality is POOR based upon whether the message's quality metric for packet loss is greater than or equal to the threshold value for POOR packet loss quality. This determination is performed by comparing the value of the message quality metric with the threshold value. As described below, other determinations are also made using a comparison of the message quality metric to an associated threshold for determining whether message quality is one of the message qualities for the time interval. If the packet loss is POOR, then the instantaneous quality is POOR for the interval and POOR message quality is returned 138. A POOR quality for any of the quality metrics means that the instantaneous quality is POOR. The next step after a return is step 162 as described below. If the packet loss is not POOR, then it is determined whether packet loss is FAIR 140. Packet loss is FAIR if the message's quality metric for packet loss is greater than or equal to the threshold value for FAIR packet loss quality. If it is determined that the packet loss is FAIR, the next step is 142. At step 142, the instantaneous message quality is set to FAIR. This is a temporary setting because it may determine later in the process that the instantaneous quality is different. After step 142, the next step is 144. If it is determined that the packet loss is not FAIR, the next step is 144.

At step 144, it is determined whether jitter quality is POOR based upon whether the message's quality metric for jitter is greater than or equal to the threshold value for POOR jitter quality. If the jitter is POOR, then the instantaneous quality is POOR for the interval and POOR message quality is returned 146. The next step after a return is step 162 as described below. If the jitter is not POOR, then it is determined whether jitter is FAIR 148. Jitter is FAIR if the message's quality metric for jitter is greater than or equal to the threshold value for FAIR jitter quality. If it is determined that the jitter is FAIR, the next step is 150. At step 150, the instantaneous message quality is set to FAIR. After step 150, the next step is 152. If it is determined that the jitter is not FAIR, the next step is 152.

At step 152, it is determined whether delay quality is POOR based upon whether the message's quality metric for delay is greater than or equal to the threshold value for POOR delay quality. If the delay is POOR, then the instantaneous quality is POOR for the interval and POOR message quality is returned 154. The next step after a return is step 162 as described below. If the delay is not POOR, then it is determined whether delay is FAIR 156. Delay is FAIR if the message's quality metric for delay is greater than or equal to the threshold value for FAIR delay quality. If it is determined that the delay is FAIR, the next step is 158. At step 158, the instantaneous message quality is set to FAIR. After step 158, the next step is 160. If it is determined that the delay is not FAIR, the next step is 160.

Step 160 returns the current set message quality, which may be either GOOD, FAIR, or POOR. There are GOOD, FAIR, POOR, and UNABLE TO CALCULATE message quality counters associated with each message. Next at step 162, the message quality counter for the current message is incremented 162.

Next, it is determined whether there are more messages in the message list 164. If so, the pointer goes to the next message in the message list 166. If there are not more messages in the message list, the process stops 168. Now, the instantaneous message quality has been determined for all of the messages in the 5-second time interval.

Referring now to FIGS. 2A, 2B, and 2C, a process 200 is illustrated as a flow diagram of an embodiment of the present invention for characterizing network segment quality for a segment transmitting messages from one endpoint to a second endpoint is illustrated. In this embodiment, the process 200 is executed for the traffic for each of endpoints A and B. The process starts at step 202. Next at step 204, it is determined whether the message quality is GOOD for endpoint A, i.e. message transmission from the first endpoint to the second endpoint. As stated hereinbefore, the message quality GOOD is highest among the message qualities. This is determined by extracting the message quality from message statistics (FIG. 6) for the last message in the message list for endpoint A. If the message quality is GOOD, then the problem value for segment A1 is set to OK at step 206. When the problem value for segment A1 is set to OK then any icon associated with segment A1 in the display is cleared. As described hereinbefore, this action indicates to a user there is no problem associated with the segment. If it is determined that the message quality is not GOOD, the process proceeds to step 216 (described in further detail hereinafter).

After step 206, the process proceeds to step 208, at which it is determined whether A2's jitter and packet loss are below the threshold for FAIR. A2's jitter and packet loss are represented by the quality metrics extracted from RTP messages received by the network analyzer. These are the RTP messages that are being transmitted from endpoint B to endpoint A. If A2's jitter and packet loss are below the FAIR threshold, the process goes to step 210. At step 210, A2's problem value is set to OK. If A2's jitter and packet loss are below the FAIR threshold, A2's problem value is set to PRIMARY. When the problem value for a segment is set to PRIMARY then a primary icon is displayed above the problem indicator for the segment in the display. After both steps 210 and 212, the process stops at step 214. Then the process 200 begins again at step 202 for endpoint B.

Referring back to step 216, it is determined whether the message quality for endpoint A is not either of the other message qualities, either FAIR or POOR in this example, then the message quality is not determinable. If the message quality is not determinable, then the process proceeds to step 218. Otherwise, the process proceeds to step 226 (described in detail hereinafter). At step 218, A1's problem value is set to No RTCP. When the problem value for a segment is set to No RTCP then an UNDETERMINED icon is displayed above the problem indicator for the segment in the display. After step 218, it is determined whether A1's jitter or packet loss is above the FAIR threshold 220. If A1's jitter or packet loss is above the FAIR threshold, the process proceeds to step 224, at which A2's problem value is set to PRIMARY. Thereafter, the process stops at 214. If A1's jitter or packet loss is not above the fair threshold, the process proceeds to step 222, at which A2's problem value is set to OK. Otherwise, if A1's jitter or packet loss is above the FAIR threshold, A2's problem value is set to PRIMARY 224. After steps 222 and 224, the process stops 214.

Next in the process 200, each quality metric for each segment is compared with thresholds to determine the characterization of the segment. Also, the segments are compared to each other to determine which has the more serious problem. Referring now to step 226, it is determined whether the endpoint A packet loss is above the POOR threshold, the lowest threshold. If the endpoint packet loss is above the POOR threshold, the process proceeds to step 228 (referred to in further detail hereinafter), at which it is determined whether A1's packet loss is below the POOR threshold. Otherwise, if the endpoint packet loss is not above the POOR threshold, the process proceeds to step 232 (referred to in further detail hereinafter), at which it is determined whether the endpoint packet loss is above the FAIR threshold. The FAIR threshold is the next highest threshold for packet loss.

At step 228, it is determined whether A1's packet loss is below the POOR threshold. If it is below the POOR threshold, the process proceeds to step 234. Otherwise, A1's problem value is set to PRIMARY 230, and then the process proceeds to step 240.

At step 234, it is determined whether A2's packet loss is below the POOR threshold. If the packet loss is not below the POOR threshold, A1 and A2's problem value is set to PRIMARY, and then the process proceeds to step 242. If the packet loss is below the POOR threshold at step 234, the process proceeds to step 236. At step 236, A1's problem value is set to PRIMARY. The process 200 then proceeds to step 242. Beginning at step 242, thresholds for jitter are analyzed.

If A2's packet loss is not below the POOR threshold at step 234, the process proceeds to step 238 at which A1 and A2's problem value is set to PRIMARY. The process 200 then proceeds to step 242.

Referring again to step 232, it is determined whether packet loss is above the FAIR threshold. If packet loss is not above the FAIR threshold the process proceeds to step 242 (described in detail hereinafter), wherein jitter for each segment is analyzed. Otherwise, if the endpoint packet loss is not above the FAIR threshold, the process proceeds to step 244 (referred to in further detail hereinafter), at which it is determined whether the endpoint packet loss is above the FAIR threshold. The FAIR threshold is the next highest threshold for packet loss.

At step 244, it is determined whether A1's packet loss is below the FAIR threshold. If it is below the POOR threshold, the process proceeds to step 248. Otherwise, A1's problem value is set to PRIMARY 246, and then the process proceeds to step 254.

At step 248, it is determined whether A2's packet loss is below the FAIR threshold. If the packet loss is not below the FAIR threshold, A1 and A2's problem value is set to PRIMARY, and then the process proceeds to step 242. If the packet loss is below the FAIR threshold at step 248, the process proceeds to step 250. At step 250, A1's problem value is set to PRIMARY. The process 200 then proceeds to step 242.

If A2's packet loss is not below the FAIR threshold at step 248, the process proceeds to step 252 at which A1 and A2's problem value is set to PRIMARY. The process 200 then proceeds to step 242.

Referring now to step 242, it is determined whether the endpoint A jitter is above the POOR threshold. If the endpoint jitter is above the POOR threshold, the process proceeds to step 258 (described in further detail hereinafter), at which it is determined whether A1's jitter is below the POOR threshold. Otherwise, if the endpoint jitter is not above the POOR threshold, the process proceeds to step 256 (described in further detail hereinafter), at which it is determined whether the endpoint jitter is above the FAIR threshold. The FAIR threshold is the next highest threshold for jitter.

At step 258, it is determined whether A1's jitter is below the POOR threshold. If it is below the POOR threshold, the process proceeds to step 262. Otherwise, A1's problem value is set to PRIMARY 260, and then the process proceeds to step 268.

At step 234, it is determined whether A2's jitter is below the POOR threshold. If the jitter is not below the POOR threshold, A1 and A2's problem value is set to PRIMARY, and then the process proceeds to step 242. If the jitter is below the POOR threshold at step 262, the process proceeds to step 264. At step 264, A1's problem value is set to PRIMARY. The process 200 then proceeds to step 282. Beginning at step 282, the process 200 compares the quality metrics for each segment.

If A2's jitter is not below the POOR threshold at step 262, the process proceeds to step 266 at which A1 and A2's problem value is set to PRIMARY. The process 200 then proceeds to step 282.

Referring again to step 256, it is determined whether jitter is above the FAIR threshold. If jitter is not above the FAIR threshold the process proceeds to step 282 (described in detail hereinafter). Otherwise, if the endpoint jitter is not above the FAIR threshold, the process proceeds to step 270 (referred to in further detail hereinafter), at which it is determined whether the endpoint jitter is above the FAIR threshold.

At step 270, it is determined whether A1's jitter is below the FAIR threshold. If it is below the POOR threshold, the process proceeds to step 274. Otherwise, A1's problem value is set to PRIMARY 272, and then the process proceeds to step 280.

At step 274, it is determined whether A2's jitter is below the FAIR threshold. If the jitter is not below the FAIR threshold, A1 and A2's problem value is set to PRIMARY, and then the process proceeds to step 282. If the jitter is below the FAIR threshold at step 274, the process proceeds to step 276. At step 276, A1's problem value is set to PRIMARY. The process 200 then proceeds to step 282.

If A2's jitter is not below the FAIR threshold at step 274, the process proceeds to step 278 at which A1 and A2's problem value is set to PRIMARY. The process 200 then proceeds to step 282.

At step 282, it is determined whether A1 and A2's problem values are both PRIMARY. If A1 and A2's problem values are not both PRIMARY, the process stops at 290. Otherwise, the process continues to step 292. From step 292 and on, it is determined which statistic sitter or packet loss) caused the problem value to go into PRIMARY. At step 292, it is determined whether both jitter and packet loss are causing the problem. This is determined from the results of prior steps 242 and 246 (FIG. 2B) since a yes answer to either identifies jitters as the problem and steps 226 and 232 (FIG. 2A) were a yes answer to either indicates packet loss as the cause. These earlier step results are stored and later accessed into step 292 to make its determination.

If both jitter and packet loss are causing the problem, it is determined whether A1's jitter and packet loss are more than A2's jitter and packet loss (described in more detail hereinafter). Otherwise, it is determined whether the problem is from jitter 296. If the problem is from jitter, it is determined whether the jitter of A1 and A2 are equal 298 (described in more detail hereinafter). Otherwise, we know that the problem is from packet loss and the process proceeds to step 350, at which it is determined whether the packet loss of A1 and A2 are equal. If both the packet loss of A1 and A2 are equal, then the problem value of A1 and A2 are set to PRIMARY at step 352, and then the process stops at step 354.

If the packet loss of A1 and A2 are not equal at step 350, it is determined whether A1's packet loss is smaller than A2's packet loss 356. If A1's packet loss is greater than A2's packet loss, A1's problem value is set to PRIMARY 358. Otherwise, A2's problem value is set to PRIMARY 360. After steps 358 and 360, the process stops at step 380.

Now referring to step 298, it is determined whether the jitter of A1 and A2 are equal 298. If the jitter of A1 and A2 are equal, then the problem value of A1 and A2 are set to PRIMARY at step 362, and then the process stops at step 364. Otherwise, it is determined whether A1's jitter is smaller than A2's jitter 366. If A1's jitter is smaller than A2's jitter, A1's problem value is set to PRIMARY 368. Otherwise, A2's problem value is set to PRIMARY 370. After steps 368 and 370, the process stops at step 380.

Referring now to step 294, it is determined whether A1's jitter and packet loss are more than A2's jitter and packet loss. If this is true, A2's problem value is set to PRIMARY 374. Otherwise, it is determined whether A2's jitter and packet loss are more than A2's jitter and packet loss 372. If this is true, A1's problem value is set to PRIMARY 376. Otherwise, the problem value of A1 and A2 are set to PRIMARY at step 378. After steps 374, 376, and 378, the process stops at step 380.

While a preferred form of the invention has been shown in the drawings and described, since variations in the preferred form will be apparent to those skilled in the art, the invention should not be construed as limited to the specific form shown and described, but instead is as set forth in the following claims.

What is claimed is:

1. A method for characterizing network segment quality for a segment transmitting messages from a first endpoint to a second endpoint on a network, the network having first and second segments connected to the first and second endpoints respectively and to each other at a juncture, the method comprising:

receiving messages transmitted between the first and second endpoints at the juncture, the messages including a first set of quality metrics for message transmission from the first to second endpoint for both the first and second segments and including a second set of quality metrics for message transmission from the first endpoint to the juncture;

subtracting the second set of quality metrics from the corresponding quality metrics of the first set of quality metrics to calculate a third set of quality metrics representing the quality metrics of the second segment; and comparing the third set of quality metrics to a first set of segment qualities to characterize the quality of the second segment.

2. The method of claim 1 further comprising comparing the second set of quality metrics to a second set of segment qualities to characterize the quality of the first segment.

3. The method of claim 2 further comprising comparing the first set of quality metrics to a third set of segment qualities to characterize the quality of the message transmission from the first endpoint to second endpoint.

4. The method of claim 3 wherein each quality metric of the first set of quality metrics is associated with a threshold for determining whether call quality is the highest segment quality of the third set of segment qualities.

5. The method of claim 4 wherein comparing the third set of quality metrics to a first set of segment qualities further includes:

determining whether the quality of message transmission from the first endpoint to the second endpoint is the highest segment quality from among the third set of segment qualities; and if the quality of message transmission from the first endpoint to the second endpoint is the high segment quality, indicating to a user there is no problem with the second segment.

6. The method of claim 1 further comprising:

determining whether the second set of quality metrics are each below associated thresholds for the first segment; and if the second set of quality metrics are each below associated thresholds, indicating to a user there is no problem with the first segment.

7. The method of claim 1 further comprising:

determining whether the second set of quality metrics are each below associated thresholds for the first segment; and if the second set of quality metrics are not each below associated thresholds, indicating to a user there is a problem with the first segment.

8. The method of claim 1 further comprising:

determining whether the quality of message transmission from the first endpoint to the second endpoint is determinable; and if the quality of message transmission from the first endpoint to the second endpoint is not determinable, indicating to a user the network segment quality for the second segment is undeterminable.

9. The method of claim 1 wherein comparing the third set of quality metrics further includes:

determining whether at least one quality metric of the first set of quality metrics is above an associated threshold;

if the at least one quality metric of the first set of quality metrics is above the associated threshold, determining whether at least one quality metric of the third set of quality metrics is below a associated threshold for the second segment; and if the at least one quality metric is not below the associated threshold for the second segment, indicating to a user there is a problem with the second segment.

10. The method of claim 9 further comprising:

if the at least one quality metric is not below the associated threshold for the second segment, determining whether at least one quality metric of the second set of quality metrics is below an associated threshold for the first segment; and if the at least one quality metric of the second set of quality metrics is below an associated threshold for the first segment, indicating to a user there is a problem with the first segment.

11. The method of claim 9 further comprising:

if the at least one quality metric is below the associated threshold for the second segment, determining whether at least one quality metric of the second set of quality metrics is below an associated threshold for the first segment; and if the at least one quality metric of the second set of quality metrics is not below the associated threshold for the first segment, indicating to a user there is a problem with the first segment and second segment.

12. The method of claim 9 further comprising:

if the at least one quality metric is below the associated threshold for the second segment, determining whether at least one quality metric of the second set of quality metrics is below an associated threshold for the first segment; and if the at least one quality metric of the second set of quality metrics is below the associated threshold for the first segment, indicating to a user there is a problem with the first segment.

13. The method of claim 1 further comprising:

determining whether any of the quality metrics for both the first and second segments are below an associated threshold for each quality metric; and if any of the quality metrics for both the first and second segments are below an associated threshold for each quality metric, indicating to a user there is a problem with both the first and second segments.

14. The method of claim 13 further comprising:

if any of the quality metrics for both the first and second segments are below an associated threshold for each quality metric, determining for at least one quality metric whether the quality metric corresponding to the first segment is less than the quality metric corresponding to the second segment; and if the quality metric corresponding to the first segment is less than the quality metric corresponding to the second segment, indicating to a user there is a problem with the first segment.

15. The method of claim 14 further comprising:

if the quality metric corresponding to the first segment is not less than the quality metric corresponding to the second segment, indicating to a user there is a problem with the second segment.

16. A computer program product for enabling a computer system to characterize network segment quality for a segment transmitting messages from a first endpoint to a second endpoint on a network, the network having first and second segments connected to the first and second endpoints respectively and to each other at a juncture, the computer program product including a computer program comprising:

instructions for receiving messages transmitted between the first and second endpoints at the juncture, the messages including a first set of quality metrics for message transmission from the first to second endpoint for both the first and second segments and including a second set of quality metrics for message transmission from the first endpoint to the juncture;

instructions for subtracting the second set of quality metrics from the corresponding quality metrics of the first set of quality metrics to calculate a third set of quality metrics representing the quality metrics of the second segment; and instructions for comparing the third set of quality metrics to a first set of segment qualities to characterize the quality of the second segment.

17. The computer program product of claim 16 further comprising instruction for comparing the second set of quality metrics to a second set of segment qualities to characterize the quality of the first segment.

18. The computer program product of claim 17 further comprising instructions for comparing the first set of quality metrics to a third set of segment qualities to characterize the quality of the message transmission from the first endpoint to second endpoint.

19. The computer program product of claim 18 wherein each quality metric of the first set of quality metrics is associated with a threshold for determining whether call quality is the highest segment quality of the third set of segment qualities.

20. The computer program product of claim 19 wherein the instructions for comparing the third set of quality metrics to a first set of segment qualities further includes:

instructions for determining whether the quality of message transmission from the first endpoint to the second endpoint is the highest segment quality from among the third set of segment qualities; and instructions for indicating to a user there is no problem with the second segment, if the quality of message transmission from the first endpoint to the second endpoint is the high segment quality.

21. The computer program product of claim 16 further comprising:

instructions for determining whether the second set of quality metrics are each below associated thresholds for the first segment; and instructions for indicating to a user there is no problem with the first segment, if the second set of quality metrics are each below associated thresholds.

22. The computer program product of claim 16 further comprising:

instructions for determining whether the second set of quality metrics are each below associated thresholds for the first segment; and instructions for indicating to a user there is a problem with the first segment, if the second set of quality metrics are not each below associated thresholds.

23. The computer program product of claim 16 further comprising:

instructions for determining whether the quality of message transmission from the first endpoint to the second endpoint is determinable; and instructions for indicating to a user the network segment quality for the second segment is undeterminable, if the quality of message transmission from the first endpoint to the second endpoint is not determinable.

24. The computer program product of claim 16 wherein the instructions for comparing the third set of quality metrics further includes:

instructions for determining whether at least one quality metric of the first set of quality metrics is above an associated threshold;

instructions for determining whether at least one quality metric of the third set of quality metrics is below a associated threshold for the second segment, if the at least one quality metric of the first set of quality metrics is above the associated threshold; and instructions for indicating to a user there is a problem with the second segment, if the at least one quality metric is not below the associated threshold for the second segment.

25. The computer program product of claim 24 further comprising:

instructions for determining whether at least one quality metric of the second set of quality metrics is below an associated threshold for the first segment, if the at least one quality metric is not below the associated threshold for the second segment; and instructions for indicating to a user there is a problem with the first segment, if the at least one quality metric of the second set of quality metrics is below an associated threshold for the first segment.

26. The computer program product of claim 24 further comprising:

instructions for determining whether at least one quality metric of the second set of quality metrics is below an associated threshold for the first segment, if the at least one quality metric is below the associated threshold for the second segment; and instructions for indicating to a user there is a problem with the first segment and second segment, if the at least one quality metric of the second set of quality metrics is not below the associated threshold for the first segment.

27. The computer program product of claim 24 further comprising:

instructions for determining whether at least one quality metric of the second set of quality metrics is below an associated threshold for the first segment, if the at least one quality metric is below the associated threshold for the second segment; and instructions for indicating to a user there is a problem with the first segment, if the at least one quality metric of the second set of quality metrics is below the associated threshold for the first segment.

28. The computer program product of claim 16 further comprising:

instructions for determining whether any of the quality metrics for both the first and second segments are below an associated threshold for each quality metric; and instructions for indicating to a user there is a problem with both the first and second segments, if any of the quality metrics for both the first and second segments are below an associated threshold for each quality metric.

29. The computer program product of claim 28 further comprising:

instructions for determining for at least one quality metric whether the quality metric corresponding to the first segment is less than the quality metric corresponding to the second segment, if any of the quality metrics for both the first and second segments are below an associated threshold for each quality metric; and instructions for indicating to a user there is a problem with the first segment, if the quality metric corresponding to the first segment is less than the quality metric corresponding to the second segment.

30. The computer program product of claim 29 further comprising:

instructions for indicating to a user there is a problem with the second segment, if the quality metric corresponding to the first segment is not less than the quality metric corresponding to the second segment.

31. Apparatus for characterizing network segment quality for a segment transmitting messages from a first endpoint to a second endpoint on a network, the network having first and second segments connected to the first and second endpoints respectively and to each other at a juncture, the apparatus comprising means for receiving messages transmitted between the first and second endpoints at the juncture, the messages including a first set of quality metrics for message transmission from the first to second endpoint for both the first and second segments and including a second set of quality metrics for message transmission from the first endpoint to the juncture;

means for subtracting the second set of quality metrics from the corresponding quality metrics of the first set of quality metrics to calculate a third set of quality metrics representing the quality metrics of the second segment; and means for comparing the third set of quality metrics to a first set of segment qualities to characterize the quality of the second segment.

32. The apparatus of claim 31 further comprising means for comparing the second set of quality metrics to a second set of segment qualities to characterize the quality of the first segment.

33. The apparatus of claim 32 further comprising means for comparing the first set of quality metrics to a third set of segment qualities to characterize the quality of the message transmission from the first endpoint to second endpoint.

34. The apparatus of claim 33 wherein each quality metric of the first set of quality metrics is associated with a threshold for determining whether call quality is the highest segment quality of the third set of segment qualities.

35. The apparatus of claim 34 wherein the means for comparing the third set of quality metrics to a first set of segment qualities further includes:

means for determining whether the quality of message transmission from the first endpoint to the second endpoint is the highest segment quality from among the third set of segment qualities; and means for indicating to a user there is no problem with the second segment, if the quality of message transmission from the first endpoint to the second endpoint is the high segment quality.

36. The apparatus of claim 31 further comprising:

means for determining whether the second set of quality metrics are each below associated thresholds for the first segment; and means for indicating to a user there is no problem with the first segment, if the second set of quality metrics are each below associated thresholds.

37. The apparatus of claim 31 further comprising:

means for determining whether the second set of quality metrics are each below associated thresholds for the first segment; and means for indicating to a user there is a problem with the first segment, if the second set of quality metrics are not each below associated thresholds.

38. The apparatus of claim 31 further comprising:

means for determining whether the quality of message transmission from the first endpoint to the second endpoint is determinable; and means for indicating to a user the network segment quality for the second segment is undeterminable, if the quality of message transmission from the first endpoint to the second endpoint is not determinable.

39. The apparatus of claim 31 wherein the means for comparing the third set of quality metrics further includes:

means for determining whether at least one quality metric of the first set of quality metrics is above an associated threshold;

means for determining whether at least one quality metric of the third set of quality metrics is below a associated threshold for the second segment, if the at least one quality metric of the first set of quality metrics is above the associated threshold; and means for indicating to a user there is a problem with the second segment, if the at least one quality metric is not below the associated threshold for the second segment.

40. The apparatus of claim 39 further comprising:

means for determining whether at least one quality metric of the second set of quality metrics is below an associated threshold for the first segment, if the at least one quality metric is not below the associated threshold for the second segment; and means for indicating to a user there is a problem with the first segment, if the at least one quality metric of the second set of quality metrics is below an associated threshold for the first segment.

41. The apparatus of claim 39 further comprising:

means for determining whether at least one quality metric of the second set of quality metrics is below an associated threshold for the first segment, if the at least one quality metric is below the associated threshold for the second segment; and means for indicating to a user there is a problem with the first segment and second segment, if the at least one quality metric of the second set of quality metrics is not below the associated threshold for the first segment.

42. The apparatus of claim 39 further comprising:

means for determining whether at least one quality metric of the second set of quality metrics is below an associated threshold for the first segment, if the at least one quality metric is below the associated threshold for the second segment; and means for indicating to a user there is a problem with the first segment, if the at least one quality metric of the second set of quality metrics is below the associated threshold for the first segment.

43. The apparatus of claim 31 further comprising:

means for determining whether any of the quality metrics for both the first and second segments are below an associated threshold for each quality metric; and means for indicating to a user there is a problem with both the first and second segments, if any of the quality metrics for both the first and second segments are below an associated threshold for each quality metric.

44. The apparatus of claim 43 further comprising:

means for determining for at least one quality metric whether the quality metric corresponding to the first segment is less than the quality metric corresponding to the second segment, if any of the quality metrics for both the first and second segments are below an associated threshold for each quality metric; and means for indicating to a user there is a problem with the first segment, if the quality metric corresponding to the first segment is less than the quality metric corresponding to the second segment.

45. The apparatus of claim 44 further comprising:

means for indicating to a user there is a problem with the second segment, if the quality metric corresponding to the first segment is not less than the quality metric corresponding to the second segment.

* * * * *